(12) United States Patent
Wagner

(10) Patent No.: US 11,037,179 B2
(45) Date of Patent: Jun. 15, 2021

(54) METHODS AND APPARATUS TO MODEL CONSUMER CHOICE SOURCING

(71) Applicant: The Nielsen Company (US), LLC, New York, NY (US)

(72) Inventor: John G. Wagner, Cincinnati, OH (US)

(73) Assignee: Nielsen Consumer LLC, New York, NY (US)

( * ) Notice: Subject to any disclaimer, the term of this patent is extended or adjusted under 35 U.S.C. 154(b) by 0 days.

(21) Appl. No.: 16/508,013

(22) Filed: Jul. 10, 2019

(65) Prior Publication Data

US 2020/0005338 A1 Jan. 2, 2020

Related U.S. Application Data

(63) Continuation of application No. 15/680,939, filed on Aug. 18, 2017, now Pat. No. 10,354,263, which is a
(Continued)

(51) Int. Cl.
*G06Q 30/02* (2012.01)
*G06N 7/00* (2006.01)
*G06Q 10/04* (2012.01)

(52) U.S. Cl.
CPC ......... *G06Q 30/0201* (2013.01); *G06N 7/005* (2013.01); *G06Q 10/04* (2013.01); *G06Q 30/0203* (2013.01)

(58) Field of Classification Search
None
See application file for complete search history.

(56) References Cited

U.S. PATENT DOCUMENTS 4,115,761 A 9/1978 Ueda et al.
4,603,232 A 7/1986 Kurland et al.
(Continued)

FOREIGN PATENT DOCUMENTS

JP 2001331627 11/2001
JP 2002015097 1/2002
(Continued)

OTHER PUBLICATIONS

Jay Dow and James Endersby, Multinomial Probit and Multinomial Logit: A Comparison of Choice Models for Voting Research, 2003, Electoral Studies, vol. 23, pp. 107-122 (Year: 2003).*
(Continued)

*Primary Examiner* — Amanda Gurski
(74) *Attorney, Agent, or Firm* — Hanley, Flight & Zimmerman, LLC

(57) ABSTRACT

Methods, systems and apparatus are disclosed to model consumer choices. An example apparatus includes a multinomial logit (MNL) engine to add a set of products having respondent choice data to a base MNL model, an aggregate building engine to improve a computational efficiency of model generation by generating a number of copies of the base MNL model, each one of the number of copies of the base MNL model exhibiting an effect of an independence or irrelevant alternatives (IIA) property, a sourcing modifier to proportionally affect interrelationships between dissimilar ones of the number of products in the set by inserting sourcing effect values in the aggregate model, an estimator to estimate the item utility parameters of the aggregate model based on the number of copies of the base MNL model and the respondent choice data, and a simulation engine to calculate the choice probability.

20 Claims, 10 Drawing Sheets

Related U.S. Application Data continuation of application No. 14/559,084, filed on Dec. 3, 2014, now abandoned, which is a continuation of application No. 13/081,924, filed on Apr. 7, 2011, now abandoned.

(56) References Cited

U.S. PATENT DOCUMENTS

| | | |
|---|---|---|
| 4,908,761 A | 3/1990 | Tai |
| 4,935,877 A | 6/1990 | Koza |
| 5,041,972 A | 8/1991 | Frost |
| 5,090,909 A | 2/1992 | Kellar et al. |
| 5,124,911 A | 6/1992 | Sack |
| 5,124,991 A | 6/1992 | Allen |
| 5,222,192 A | 6/1993 | Shaefer |
| 5,255,345 A | 10/1993 | Shaefer |
| 5,299,115 A | 3/1994 | Fields et al. |
| 5,321,833 A | 6/1994 | Chang et al. |
| 5,375,195 A | 12/1994 | Johnston |
| 5,400,248 A | 3/1995 | Chisholm |
| 5,420,786 A | 5/1995 | Felthauser et al. |
| 5,559,729 A | 9/1996 | Abe |
| 5,583,763 A | 12/1996 | Atcheson et al. |
| 5,608,424 A | 3/1997 | Takahashi et al. |
| 5,615,341 A | 3/1997 | Agrawal et al. |
| 5,651,098 A | 7/1997 | Inoue et al. |
| 5,654,098 A | 8/1997 | Aono et al. |
| 5,687,369 A | 11/1997 | Li |
| 5,704,017 A | 12/1997 | Heckerman et al. |
| 5,717,865 A | 2/1998 | Stratmann |
| 5,724,567 A | 3/1998 | Rose et al. |
| 5,734,890 A | 3/1998 | Case et al. |
| 5,754,938 A | 5/1998 | Herz et al. |
| 5,819,245 A | 10/1998 | Peterson et al. |
| 5,884,282 A | 3/1999 | Robinson |
| 5,893,098 A | 4/1999 | Peters et al. |
| 5,913,204 A | 6/1999 | Kelly |
| 5,918,014 A | 6/1999 | Robinson |
| 5,930,780 A | 7/1999 | Hughes et al. |
| 5,995,951 A | 11/1999 | Ferguson |
| 6,012,051 A | 1/2000 | Sammon, Jr. et al. |
| 6,029,139 A | 2/2000 | Cunningham et al. |
| 6,041,311 A | 3/2000 | Chislenko et al. |
| 6,049,777 A | 4/2000 | Sheena et al. |
| 6,064,980 A | 5/2000 | Jacobi et al. |
| 6,064,996 A | 5/2000 | Yamaguchi et al. |
| 6,070,145 A | 5/2000 | Pinsley et al. |
| 6,078,740 A | 6/2000 | Detreville |
| 6,088,510 A | 7/2000 | Sims |
| 6,093,026 A | 7/2000 | Walker et al. |
| 6,098,048 A | 8/2000 | Dashefsky et al. |
| 6,115,700 A | 9/2000 | Ferkinhoff et al. |
| 6,125,351 A | 9/2000 | Kauffman |
| 6,151,585 A | 11/2000 | Altschuler et al. |
| 6,155,839 A | 12/2000 | Clark et al. |
| 6,167,445 A | 12/2000 | Gai et al. |
| 6,175,833 B1 | 1/2001 | West et al. |
| 6,202,058 B1 | 3/2001 | Rose et al. |
| 6,233,564 B1 | 5/2001 | Schulze, Jr. |
| 6,236,977 B1 | 5/2001 | Verba et al. |
| 6,249,714 B1 | 6/2001 | Hocaoglu et al. |
| 6,266,649 B1 | 7/2001 | Linden et al. |
| 6,281,651 B1 | 8/2001 | Haanpaa et al. |
| 6,304,861 B1 | 10/2001 | Ferguson |
| 6,366,890 B1 | 4/2002 | Usrey |
| 6,380,928 B1 | 4/2002 | Todd |
| 6,385,620 B1 | 5/2002 | Kurzius et al. |
| 6,397,212 B1 | 5/2002 | Biffar |
| 6,438,579 B1 | 8/2002 | Hosken |
| 6,460,036 B1 | 10/2002 | Herz |
| 6,477,504 B1 | 11/2002 | Hamlin et al. |
| 6,546,380 B1 | 4/2003 | Lautzenheiser et al. |
| 6,574,585 B2 | 6/2003 | Caruso et al. |
| 6,629,097 B1 | 9/2003 | Keith |
| 6,636,862 B2 | 10/2003 | Lundahl et al. |
| 6,714,929 B1 | 3/2004 | Micaelian et al. |
| 6,741,967 B1 | 5/2004 | Wu et al. |
| 6,754,635 B1 | 6/2004 | Hamlin et al. |
| 6,778,807 B1 | 8/2004 | Martino et al. |
| 6,826,541 B1 | 11/2004 | Johnston et al. |
| 6,839,680 B1 | 1/2005 | Liu et al. |
| 6,859,782 B2 | 2/2005 | Harshaw |
| 6,873,965 B2 | 3/2005 | Feldman et al. |
| 6,895,388 B1 | 5/2005 | Smith |
| 6,901,424 B1 | 5/2005 | Winn |
| 6,915,269 B1 | 7/2005 | Shapiro et al. |
| 6,934,748 B1 | 8/2005 | Louviere et al. |
| 6,944,514 B1 | 9/2005 | Matheson |
| 6,973,418 B1 | 12/2005 | Kirshenbaum |
| 6,993,495 B2 | 1/2006 | Smith, Jr. et al. |
| 6,999,987 B1 | 2/2006 | Billingsley et al. |
| 7,016,882 B2 | 3/2006 | Afeyan et al. |
| 7,054,828 B2 | 5/2006 | Heching et al. |
| 7,058,590 B2 | 6/2006 | Shan |
| 7,103,561 B1 | 9/2006 | Sarkisian et al. |
| 7,114,163 B2 | 9/2006 | Hardin et al. |
| 7,117,163 B1 | 10/2006 | Iyer et al. |
| 7,177,851 B2 | 2/2007 | Afeyan et al. |
| 7,191,143 B2 | 3/2007 | Keli et al. |
| 7,197,485 B2 | 3/2007 | Fuller |
| 7,233,914 B1 | 6/2007 | Wijaya et al. |
| 7,249,044 B2 | 7/2007 | Kumar et al. |
| 7,269,570 B2 | 9/2007 | Krotki |
| 7,281,655 B2 | 10/2007 | Wagner et al. |
| 7,302,475 B2 | 11/2007 | Gold et al. |
| 7,308,418 B2 | 12/2007 | Malek et al. |
| 7,337,127 B1 | 2/2008 | Smith et al. |
| 7,359,913 B1 | 4/2008 | Ordonez |
| 7,398,223 B2 | 7/2008 | Kahlert et al. |
| 7,562,063 B1 | 7/2009 | Chaturvedi |
| 7,596,505 B2 | 9/2009 | Keli et al. |
| 7,610,249 B2 | 10/2009 | Afeyan et al. |
| 7,630,986 B1 | 12/2009 | Herz et al. |
| 7,711,580 B1 | 5/2010 | Hudson |
| 7,730,002 B2 | 6/2010 | Afeyan et al. |
| 7,836,057 B1 | 11/2010 | Micaelian et al. |
| 7,860,776 B1 | 12/2010 | Chin et al. |
| 7,877,346 B2 | 1/2011 | Karty |
| 7,912,898 B2 | 3/2011 | Gold et al. |
| 8,082,519 B2 | 12/2011 | Oron et al. |
| 8,103,540 B2 | 1/2012 | Gross |
| 8,150,795 B2 | 4/2012 | Montgomery, Jr. et al. |
| 8,234,152 B2 | 7/2012 | Jepson et al. |
| 8,620,717 B1 | 12/2013 | Micaelian et al. |
| 8,868,448 B2 | 10/2014 | Freishtat et al. |
| 9,785,995 B2 | 10/2017 | Malek et al. |
| 9,799,041 B2 | 10/2017 | Karty et al. |
| 10,354,263 B2 | 7/2019 | Wagner |
| 2001/0010041 A1 | 7/2001 | Harshaw |
| 2001/0013009 A1 | 8/2001 | Greening et al. |
| 2002/0002482 A1 | 1/2002 | Thomas |
| 2002/0004739 A1 | 1/2002 | Elmer et al. |
| 2002/0016731 A1 | 2/2002 | Kupersmit |
| 2002/0046128 A1 | 4/2002 | Abe et al. |
| 2002/0052774 A1 | 5/2002 | Parker et al. |
| 2002/0077881 A1 | 6/2002 | Krotki |
| 2002/0087388 A1 | 7/2002 | Keil et al. |
| 2002/0107852 A1 | 8/2002 | Oblinger |
| 2002/0111780 A1 | 8/2002 | Sy |
| 2002/0128898 A1 | 9/2002 | Smith, Jr. et al. |
| 2002/0133502 A1 | 9/2002 | Rosenthal et al. |
| 2002/0152110 A1 | 10/2002 | Stewart et al. |
| 2002/0161664 A1 | 10/2002 | Shaya et al. |
| 2002/0169727 A1 | 11/2002 | Melnick et al. |
| 2003/0014291 A1 | 1/2003 | Kane et al. |
| 2003/0018517 A1 | 1/2003 | Dull et al. |
| 2003/0037041 A1 | 2/2003 | Hertz |
| 2003/0040952 A1 | 2/2003 | Keil et al. |
| 2003/0074369 A1 | 4/2003 | Schuetze et al. |
| 2003/0078900 A1 | 4/2003 | Dool |
| 2003/0088457 A1 | 5/2003 | Keil et al. |
| 2003/0088458 A1 | 5/2003 | Afeyan et al. |
| 2003/0140012 A1 | 7/2003 | Harvey et al. |
| 2003/0187708 A1 | 10/2003 | Baydar et al. |

(56) References Cited

U.S. PATENT DOCUMENTS

| | | |
|---|---|---|
| 2003/0233337 A1 | 12/2003 | Yanase et al. |
| 2004/0123247 A1 | 6/2004 | Wachen et al. |
| 2004/0133468 A1 | 7/2004 | Varghese |
| 2004/0181461 A1 | 9/2004 | Raiyani et al. |
| 2004/0199923 A1 | 10/2004 | Russek |
| 2004/0204957 A1 | 10/2004 | Afeyan et al. |
| 2004/0210471 A1 | 10/2004 | Luby et al. |
| 2004/0225651 A1 | 11/2004 | Musgrove et al. |
| 2004/0236625 A1 | 11/2004 | Kearon |
| 2004/0249719 A1 | 12/2004 | Urpani |
| 2004/0267604 A1 | 12/2004 | Gross |
| 2005/0004819 A1 | 1/2005 | Etzioni et al. |
| 2005/0004880 A1 | 1/2005 | Musgrove et al. |
| 2005/0060222 A1 | 3/2005 | White |
| 2005/0075919 A1 | 4/2005 | Kim |
| 2005/0131716 A1 | 6/2005 | Hanan et al. |
| 2005/0197988 A1 | 9/2005 | Bublitz |
| 2005/0203807 A1 | 9/2005 | Bezos et al. |
| 2005/0209909 A1 | 9/2005 | Dull et al. |
| 2005/0261953 A1 | 11/2005 | Malek et al. |
| 2006/0004621 A1 | 1/2006 | Malek et al. |
| 2006/0026081 A1 | 2/2006 | Keil et al. |
| 2006/0080265 A1 | 4/2006 | Hinds et al. |
| 2006/0080268 A1 | 4/2006 | Afeyan et al. |
| 2006/0106656 A1* | 5/2006 | Ouimet ............... G06Q 10/063 705/7.39 |
| 2006/0112099 A1 | 5/2006 | Musgrove et al. |
| 2006/0149616 A1 | 7/2006 | Hildick-Smith |
| 2006/0247956 A1 | 11/2006 | Rosen et al. |
| 2006/0259344 A1 | 11/2006 | Patel et al. |
| 2007/0067212 A1 | 3/2007 | Bonabeau |
| 2007/0192166 A1 | 8/2007 | Van Luchene |
| 2007/0203783 A1 | 8/2007 | Beltramo |
| 2007/0218834 A1 | 9/2007 | Yogev et al. |
| 2007/0222793 A1 | 9/2007 | Olhofer et al. |
| 2007/0226073 A1 | 9/2007 | Wang |
| 2007/0282666 A1 | 12/2007 | Afeyan et al. |
| 2008/0065471 A1 | 3/2008 | Reynolds et al. |
| 2008/0077901 A1 | 3/2008 | Arsintescu |
| 2008/0086364 A1 | 4/2008 | Hahn et al. |
| 2008/0091510 A1 | 4/2008 | Crandall et al. |
| 2008/0114564 A1 | 5/2008 | Ihara |
| 2008/0147483 A1 | 6/2008 | Ji |
| 2008/0208659 A1 | 8/2008 | An et al. |
| 2008/0243637 A1 | 10/2008 | Chan et al. |
| 2008/0306895 A1 | 12/2008 | Karty |
| 2009/0006184 A1 | 1/2009 | Leach et al. |
| 2009/0076887 A1 | 3/2009 | Spivack et al. |
| 2009/0150213 A1 | 6/2009 | Cyr et al. |
| 2009/0231356 A1 | 9/2009 | Barnes et al. |
| 2009/0234710 A1* | 9/2009 | Belgaied Hassine ........................ G06Q 30/0206 705/7.29 |
| 2009/0254971 A1 | 10/2009 | Herz et al. |
| 2009/0282482 A1 | 11/2009 | Huston |
| 2009/0287728 A1 | 11/2009 | Martine et al. |
| 2009/0307055 A1 | 12/2009 | Karty |
| 2010/0010893 A1 | 1/2010 | Rajaraman et al. |
| 2010/0082441 A1 | 4/2010 | Doemling et al. |
| 2010/0125541 A1 | 5/2010 | Wendel et al. |
| 2010/0205034 A1* | 8/2010 | Zimmerman ...... G06Q 30/0202 705/7.31 |
| 2010/0306028 A1 | 12/2010 | Wagner |
| 2010/0313119 A1 | 12/2010 | Baldwin et al. |
| 2010/0318916 A1 | 12/2010 | Wilkins |
| 2011/0071874 A1* | 3/2011 | Schneersohn ...... G06Q 30/0203 705/7.32 |
| 2011/0087679 A1 | 4/2011 | Rosato et al. |
| 2011/0125591 A1 | 5/2011 | Evans |
| 2011/0261049 A1 | 10/2011 | Cardno et al. |
| 2011/0302494 A1 | 12/2011 | Callery et al. |
| 2012/0116843 A1 | 5/2012 | Karty |
| 2012/0209723 A1 | 8/2012 | Satow et al. |
| 2012/0229500 A1 | 9/2012 | Lamoureux et al. |
| 2012/0232850 A1 | 9/2012 | Lamoureux et al. |
| 2012/0232851 A1 | 9/2012 | Lamoureux et al. |
| 2012/0232852 A1 | 9/2012 | Lamoureux et al. |
| 2012/0233037 A1 | 9/2012 | Lamoureux et al. |
| 2012/0259676 A1 | 10/2012 | Wagner |
| 2013/0060662 A1 | 3/2013 | Carlson et al. |
| 2013/0103553 A1* | 4/2013 | McGill ................. G06Q 40/12 705/30 |
| 2013/0282626 A1* | 10/2013 | White .................... G06F 40/00 706/11 |
| 2014/0279203 A1 | 9/2014 | Malek et al. |
| 2014/0344013 A1 | 11/2014 | Karty et al. |
| 2015/0088609 A1 | 3/2015 | Wagner |
| 2017/0161757 A1* | 6/2017 | Zenor ............... G06Q 30/0201 |
| 2018/0033071 A1 | 2/2018 | Malek et al. |
| 2018/0268427 A1 | 9/2018 | Zimmerman et al. |
| 2020/0005338 A1 | 1/2020 | Wagner |

FOREIGN PATENT DOCUMENTS

| | | |
|---|---|---|
| JP | 2002092291 | 3/2002 |
| JP | 2002117204 | 4/2002 |
| JP | 2002215870 | 8/2002 |
| JP | 2003030537 | 1/2003 |
| KR | 1020100082650 | 7/2010 |
| WO | 0002138 | 1/2000 |
| WO | 02057986 | 7/2002 |
| WO | 2005116896 | 12/2005 |
| WO | 2006012122 | 2/2006 |
| WO | WO-2006012122 A2 * | 2/2006 ............. G06N 3/126 |
| WO | 2008022341 | 2/2008 |
| WO | 2010055017 | 5/2010 |
| WO | 2014143729 | 9/2014 |

OTHER PUBLICATIONS

"Chapter 7: Sampling in Market Research," retrieved from <http://web.archive.org/web/20050313042847/http://www.fao.org/docrep/w3241e/w3241e08.htm>, retrieved on Apr. 22, 2013 (29 pages).

"Sampling Techniques," Oct. 2003, retrieved from <http://web.archive.org/web/20031031223726/http://cs.fit.edu/~jpmcgee/classes/CSE5800/SamplingTechniques.pdf>, retrieved on Apr. 22, 2013 (12 pages).

Adomavicius et al., "Toward the Next Generation of Recommender Systems: A Survey of the State-of-the-Art and Possible Extensions," IEEE Transactions on Knowledge and Data Engineering, vol. 17, No. 6, Jun. 2005, pp. 734-749 (16 pages).

Anthony, Cynthia S "Electronic Monitoring Legislation for Businesses with Call Centers is Fraught with Problems," Telecommunications, ABI/INFORM Global, vol. 28, No. 3, Mar. 1994 (1 page).

Arsham, Hossein, "Questionnaire Design and Surveys Sampling," Mar. 4, 2004, retrieved from <http://web.archive.org/web/20040304232826/http://home.ubalt.edu/ntsbarsh/statdata/Surveys.htm>, retrieved on Apr. 22, 2013 (15 pages).

Balakrishnan et al., "Genetic Algorithm for Product Design," Management Science, vol. 42, No. 8, Aug. 1996, pp. 1105-1117 (13 pages).

Bartlett II, et al., "Organizational Research: Determining Appropriate Sample Size in Survey Research," Information Technology, Learning, and Performance Journal, vol. 19, No. 1, Spring 2001, pp. 43-50 (8 pages).

Brown et al., "Restricted Adaptive Cluster Sampling," Environmental and Ecological Statistics, vol. 5, 1998, pp. 49-63 (15 pages).

Cabena et al., "Intelligent Miner for Data Applications Guide," IBM, Redbook, SG24-5252-00, Mar. 1999 (175 pages). (NPL in 2 parts).

Callery et al., "Smart Presentation Application," U.S. Appl. No. 61/351,486, filed Jun. 4, 2010, as incorporated by reference in U.S. PG Publication 2011/0302494 (50 pages).

Canadian Intellectual Property Office, "Examiner's Report," issued in connection with Canadian Patent Application No. 2,428,079, dated Sep. 8, 2014 (2 pages).

Canadian Intellectual Property Office, "Examiner's Report," issued in connection with Canadian Patent Application No. 2,566,943, dated Oct. 17, 2013 (4 pages).

(56) References Cited

OTHER PUBLICATIONS

Cattin et al., "Commercial Use of Conjoint Analysis: A Survey," Journal of Marketing, vol. 46, Summer 1982, pp. 44-53 (8 pages).

Chen, Doris Tung, "Network Monitoring and Analysis in a Large Scale PACS and Teleradiology Environment," AAT 9620717, University of California, 1996, Abstract Only, Abstract retrieved from <http://proquest.umi.com/pqdweb?index=3&did=74184...D&RQT=309&VName=PQD&TS=1235762960&clientId=19649>, retrieved on Feb. 27, 2009 (2 pages).

Dahan et al., "The Predictive Power of Internet-Based Product Concept Testing Using Visual Depiction and Animation," Journal of Production Innovation Management, vol. 17, 2000, pp. 99-109 (11 pages).

Desmond et al., "Smart Office Tools Presentation," IBM Research, Oct. 18, 2010, retrieved from <http://ics.uci.edu/'nlopezgi/flexitools/presentations/desmond_flexitools_splash2010.pdf> (22 pages).

Desmond et al., "Towards Smart Office Tools," 2010, retrieved from <http://http://www.ics.uci.edu/~nlopezgi/flexitools/papers/desmond_flexitools_splash2010.pdf> (4 pages).

DSS Research, "A Review of Conjoint Analysis," DSS Research, retrieved from <http://www.conjoint.com/CR01.aspx>, retrieved on Feb. 26, 2015 (6 pages).

Ellis et al., "Comparing Telephone and Face-to-Face Surveys in Terms of Sample Representativeness: A Meta-Analysis of Demographic Characteristics," Ohio State University, Apr. 1999 (61 pages).

Environmental Protection Agency, "Guidance on Choosing a Sampling Design for Environmental Data Collection," EPA QA/G-5S, Dec. 2002 (178 pages). (NPL in 2 parts).

European Patent Office, "Supplemental Search Report," issued in connection with European Patent Application No. 05753821.7, dated Dec. 17, 2009 (2 pages).

European Patent Office, "Proceeding further with the European patent application pursuant to Rule 70(2) EPC," issued in connection with European Patent Application No. 05753821.7, dated Jan. 4, 2010 (1 page).

European Patent Office, "Communication Pursuant to Article 94(3) EPC," issued in connection with European Patent Application No. 05753821.7, dated Feb. 5, 2013 (5 pages).

Fienberg, Stephen E. "Notes on Stratified Sampling (for Statistics 36-303: Sampling, Surveys and Society)," Department of Statistics, Carnegie Mellon University, Mar. 12, 2003 (12 pages).

Fly, "Swap an Image in PowerPoint 2007 with Ease," CGI Interactions, Dec. 23, 2010, retrieved from <http://cgiinteractive.com/blog2010/12/swap-change-image-powerpoint-2007-ease/feed/> (3 pages).

Garcia, Fernando D.,"Computer Screen Design Aided by a Genetic Algorithm," Late Breaking Papers at the 2000 Genetic and Evolutionary Computation Conference, Whitley, D. ed. 2000, pp. 98-101 (4 pages).

Government of India Patent Office, "First Examination Report," issued in connection with Indian Patent Application No. 3684/KOLNP/2006, dated Mar. 14, 2011 (2 pages).

Graf et al., "Interactive Evolution of Images," Evolutionary Programming IV—Proc. Fourth Annual Conference—Evolutionary Programming, MIT Press, Cambridge MA, 1995, pp. 53-65 (13 pages).

Gu et al., "Sampling and Its Application in Data Mining: A Survey," National University of Singapore, Singapore, Jun. 1, 2000 (31 pages).

Gu et al., "Sampling: Knowing Whole From its Part," Instance Selection and Construction for Data Mining, Chapter 2, May 2, 2001 (32 pages).

Haupt et al., Practical Genetic Algorithms, 1998, pp. 66-70 and 85-88 (10 pages).

International Searching Authority, "International Preliminary Report on Patentability," issued in connection with International Patent Application No. PCT/US2001/51284, dated Sep. 29, 2008 (3 pages).

International Searching Authority, "International Preliminary Report on Patentability," issued in connection with International Patent Application No. PCT/US2005/021948, dated Jan. 9, 2007 (8 pages).

International Searching Authority, "International Search Report," issued in connection with International Patent Application No. PCT/US2005/021948, dated Nov. 13, 2006 (2 pages).

International Searching Authority, Written Opinion, issued in connection with International Patent Application No. PCT/US2005/021948, dated Nov. 13, 2006 (7 pages).

International Searching Authority, "International Preliminary Report on Patentability," issued in connection with International Patent Application No. PCT/US2005/17179, dated Jan. 30, 2007 (4 pages).

International Searching Authority, "International Search Report," issued in connection with International Patent Application No. PCT/US2005/17179, dated Jan. 16, 2007 (4 pages).

International Searching Authority, "Written Opinion," issued in connection with International Patent Application No. PCT/US2005/17179, dated Jan. 16, 2007 (3 pages).

International Searching Authority, "Written Opinion," issued in connection with International Patent Application No. PCT/US2012/028364, dated Jul. 11, 2012 (4 pages).

International Searching Authority, "International Search Report," issued in connection with International Patent Application No. PCT/US2012/028364, dated Jul. 11, 2012 (4 pages).

International Searching Authority, "International Search Report," issued in connection with International Patent Application No. PCT/US2012/028369, dated Jul. 11, 2012 (4 pages).

International Searching Authority, "International Preliminary Report on Patentability," issued in connection with International Patent Application No. PCT/US2012/028369, dated Sep. 10, 2013 (6 pages).

International Searching Authority, "Written Opinion," issued in connection with International Patent Application No. PCT/US2012/028369, dated Jul. 11, 2012 (5 pages).

International Searching Authority, "International Preliminary Report on Patentability," issued in connection with International Patent Application No. PCT/US2012/028373, dated Sep. 10, 2013 (6 pages).

International Searching Authority, "International Search Report," issued in connection with International Patent Application No. PCT/US2012/028373, dated Jul. 6, 2012 (4 pages).

International Searching Authority, "Written Opinion," issued in connection with International Patent Application No. PCT/US2012/028373, dated Jul. 6, 2012 (5 pages).

International Searching Authority, "Written Opinion," issued in connection with International Patent Application No. PCT/US2012/028375, dated Jul. 6, 2012 (5 pages).

International Searching Authority, "International Preliminary Report on Patentability," issued in connection with International Patent Application No. PCT/US2012/028375, dated Sep. 10, 2013 (6 pages).

International Searching Authority, "International Search Report," issued in connection with International Patent Application No. PCT/US2012/028375, dated Jul. 6, 2012 (4 pages).

International Searching Authority, "International Preliminary Report on Patentability," issued in connection with International Patent Application No. PCT/US2012/028376, dated Sep. 19, 2013 (7 pages).

International Searching Authority, "International Search Report," issued in connection with International Patent Application No. PCT/US2012/028376, dated Jul. 9, 2012 (4 pages).

International Searching Authority, "Written Opinion," issued in connection with International Patent Application No. PCT/US2012/028376, dated Jul. 9, 2012 (5 pages).

Istockphoto, "iStockphoto Announces Plug-in That Allows Users of Microsoft PowerPoint and Word to Download iStock Photos and Illustrations Directly into Presentations and Documents," iStockphoto, retrieved from <http://www.istockphoto.com/istockphoto-office-ribbon>, May 17, 2010 (4 pages).

Jacobs, Richard M., "Educational Research: Sampling a Population," EDU 8603, 2003 (89 pages).

(56) References Cited

OTHER PUBLICATIONS

Japan Patent Office, "Notice of Reasons for Rejection," issued in connection with Japanese Patent Application No. P2013-236441, dated Feb. 25, 2015 (4 pages).
Johnston, Why We Feel: The Science of Human Emotions, Perseus Books, Cambridge MA, 1999, pp. 152-155 (4 pages).
Kaye et al., "Research Methodology: Taming the Cyber Frontier-Techniques for Improving Online Surveys," Social Science Computer Review, vol. 17, No. 3, Fall 1999, pp. 323-337 (16 pages).
Kim et al., "Application of Interactive Genetic Algorithm to Fashion Design," Engineering Applications of Artificial Intelligence, vol. 13, 2000, pp. 635-644 (10 pages).
Kim et al., "Knowledge-Based Encoding in Interactive Genetic Algorithm for a Fashion Design Aid System," Genetic and Evolutionary Computation Conference, Jul. 10-12, 2000, p. 757 (4 pages).
Lunsford et al., "Research Forum—The Research Forum Sample—Part 1: Sampling," Journal of Prosthetics and Orthotics, vol. 7, No. 3, 1995, retrieved from <http://www.oandp.org/jpo/library/printArticle.asp?printArticleId=1995_03_105>, retrieved on Feb. 26, 2015 (10 pages).
Medina, Martin Humberto Felix, "Contributions to the Theory of Adaptive Sampling, Doctorate Thesis in Statistics," The Pennsylvania State University, Dec. 2000 (259 pages). (NPL in 2 parts).
O'Reilly et al., "A Preliminary Investigation of Evolution as a Form Design Strategy," Artificial Life VI, MIT Press, Cambridge MA, 1998 (5 pages).
O'Reilly et al., "Evolution as a Design Strategy for Nonlinear Architecture: Generative Modeling of 3D Surfaces," 1998 (10 pages).
Ossher et al., "Flexible Modeling Tools for Pre-Requirements Analysis: Conceptual Architecture and Research Challenges," ACM SIGPLAN Notices—OOPSLA-10, vol. 45, Issue 10, Oct. 2010, pp. 848-864 (17 pages).
Ossher et al., "Using Tagging to Identify and Organize Concerns During Pre-Requirements Analysis," Aspect-Oriented Requirements Engineering and Architecture Design, 2009, EA'09, ICSE Workshop, May 18, 2009, pp. 25-30 (6 pages).
Pazzani, Michael J., "A Framework for Collaborative, Content-Based and Demographic Filtering," Artificial Intelligence Review, vol. 13, 2000, pp. 393-408 (16 pages).
Reynolds, Reid T. "How Big is Big Enough?" American Demographics, Abstract Only, vol. 2, No. 4, Apr. 1980, Abstract retrieved from <http://search.proquest.com/printviewfile?accountid=14753>, retrieved on Apr. 22, 2013 (2 pages).
Rowland, Duncan Andrew, "Computer Graphic Control Over Human Face and Head Appearance, Genetic Optimization of Perceptual Characteristics," PhD. Thesis, University of St. Andrews, Scotland, Jan. 5, 1998, retrieved from <http://www.mindlab.msu.edu/documents/Thesis_Rowland/title.htm>, retrieved on May 12, 2000 (101 pages).
Sage Publishing, "Chapter 5: Sampling," retrieved from <http://sagepub.com/upm-data/24480_Ch5.pdf>, pp. 148-189 (42 pages).
Sims, Karl, "Artificial Evolution for Computer Graphics," Computer Graphics, vol. 25, No. 4, Jul. 1991, pp. 319-328 (22 pages).
Steiner et al., "A Probabilistic One-Step Approach to the Optimal Product Line Design Problem Using Conjoint and Cost Data," Review of Marketing Science Working Papers, vol. 1, No. 4, Working Paper 4, 2002, pp. 1-40 (41 pages).
Su et al., "An Internet-Based Negotiation Server for E-Commerce," The VLDB Journal—The International Journal on Very Large Data Bases, vol. 10, Issue 1, Aug. 2001, pp. 72-90 (20 pages).
Swain et al., "Webseer: an Image Search Engine for the World Wide Web," Technical Report, University of Chicago, 1996 retrieved from <http://citeseerx.ist.psu.edu/viewdoc/download?doi=10.1.1.44.9234&rep=rep1&type=pdf> (8 pages).
Thompson, Steven K., "Design and Inference in Adaptive Sampling," SSC Annual Meeting, Proceedings of the Survey Methods Section, Jun. 1997 (5 pages).
Thompson, Steven K., "Stratified Adaptive Cluster Sampling," Abstract Only, Biometrika, vol. 78, No. 2, 1991 (1 page).
United States Patent and Trademark Office, "Advisory Action" issued in connection with U.S. Appl. No. 12/368,028, dated Sep. 29, 2014 (3 pages).
United States Patent and Trademark Office, "Non-Final Office Action" issued in connection with U.S. Appl. No. 13/740,699, dated Jul. 18, 2014 (16 pages).
United States Patent and Trademark Office, "Non-Final Office Action," issued in connection with U.S. Appl. No. 11/758,877, dated Mar. 8, 2010 (25 pages).
United States Patent and Trademark Office, "Supplemental Notice of Allowance," issued in connection with U.S. Appl. No. 10/852,356, dated Oct. 22, 2007 (3 pages).
United States Patent and Trademark Office, "Supplemental Notice of Allowance," issued in connection with U.S. Appl. No. 10/852,356, dated Sep. 4, 2007 (3 pages).
United States Patent and Trademark Office, "Notice of Allowance," issued in connection with U.S. Appl. No. 11/758,877, dated Sep. 22, 2010 (6 pages).
United States Patent and Trademark Office, "Notice of Allowance," issued in connection with U.S. Appl. No. 10/852,356, dated Jul. 19, 2007 (22 pages).
United States Patent and Trademark Office, "Non-Final Office Action," issued in connection with U.S. Appl. No. 10/852,356, dated Jan. 3, 2007 (11 pages).
United States Patent and Trademark Office, "Non-Final Office Action," issued in connection with U.S. Appl. No. 10/053,353, dated Feb. 18, 2005 (10 pages).
United States Patent and Trademark Office, "Non-Final Office Action," issued in connection with U.S. Appl. No. 10/053,353, dated Oct. 17, 2005 (9 pages).
United States Patent and Trademark Office, "Notice of Allowance," issued in connection with U.S. Appl. No. 10/053,353, dated Nov. 8, 2006 (6 pages).
United States Patent and Trademark Office, "Non Final Office Action," issued in connection with U.S. Appl. No. 10/831,881, dated Jan. 6, 2005 (10 pages).
United States Patent and Trademark Office, "Notice of Allowance," issued in connection with U.S. Appl. No. 10/831,881, dated Aug. 4, 2005 (7 pages).
United States Patent and Trademark Office, "Notice of Allowance," issued in connection with U.S. Appl. No. 11/229,020, dated Mar. 17, 2009 (36 pages).
United States Patent and Trademark Office, "Notice of Allowance," issued in connection with U.S. Appl. No. 11/726,350, dated Jul. 13, 2009 (10 pages).
United States Patent and Trademark Office, "Non-Final Office Action," issued in connection with U.S. Appl. No. 13/282,321, dated Jul. 2, 2012 (40 pages).
United States Patent and Trademark Office, "Final Office Action," issued in connection with U.S. Appl. No. 13/282,321, dated Feb. 22, 2013 (47 pages).
United States Patent and Trademark Office, "Non-Final Office Action," issued in connection with U.S. Appl. No. 13/283,121, dated Sep. 20, 2012 (59 pages).
United States Patent and Trademark Office, "Final Office Action," issued in connection with U.S. Appl. No. 13/283,121, dated May 24, 2013 (69 pages).
United States Patent and Trademark Office, "Final Office Action," issued in connection with U.S. Appl. No. 13/283,495, dated Jan. 27, 2015 (34 pages).
United States Patent and Trademark Office, "Non-Final Office Action," issued in connection with U.S. Appl. No. 13/283,495, dated Jul. 10, 2012 (39 pages).
United States Patent and Trademark Office, "Non-Final Office Action," issued in connection with U.S. Appl. No. 13/283,495, dated Sep. 19, 2013 (50 pages).
United States Patent and Trademark Office, "Final Office Action," issued in connection with U.S. Appl. No. 13/283,495, dated Feb. 11, 2013 (46 pages).
United States Patent and Trademark Office, "Final Office Action" issued in connection with U.S. Appl. No. 13/740,699, dated Apr. 2, 2015 (18 pages).

(56) References Cited

OTHER PUBLICATIONS

Weinberger, Martin, "Getting the Quota Sample Right," Journal of Advertising Research, vol. 13, No. 5, Oct. 1973, pp. 69-72 (5 pages).
Wempen, Faithe, Microsoft PowerPoint 2010 Bible, Wiley Publishing, Inc., May 10, 2010 (819 pages). (NPL in 6 parts).
Wikipedia, "Sampling (statistics)," Oct. 24, 2005, retrieved from <http://en.wikipedia.org/wiki/Sampling_(statistics)>, retrieved on Oct. 26, 2005 (5 pages).
Witbrock et al., "Evolving Genetic Art," Evolutionary Design by Computers, 1999, pp. 251-259 (9 pages).
Bonabeau, Eric, "Agent-Based Modeling: Methods and Techniques for Simulating Human Systems," PNAS, vol. 99, Supp. 3, May 14, 2002 (8 pages).
Borgatti, Steven P., "Multi-Dimensional Scaling," retrieved from <http://www.analytictech.com/borgatti/mds.htm>, retrieved on Sep. 8, 2010 (8 pages).
Buja et al., "Interactive Data Visualization with Multidimensional Scaling," The Wharton School, University of Pennsylvania, Mar. 29, 2004 (32 pages).
Cheng et al., "Testing for IIA in the Multinomial Logit Model," Sociological Methods & Research, vol. 35, No. 4, May 2007 (19 pages).
European Patent Office, "Examination Report," issued in connection with European Patent Application No. 10001340.8, dated Mar. 31, 2011 (5 pages).
European Patent Office, "Extended European Search Report," issued in connection with European Patent Application No. 10001340.8, dated May 31, 2010 (4 pages).
European Patent Office, "Notice from the European Patent Office," Official Journal of the European Patent Office, vol. 30, No. 11, Nov. 1, 2007, pp. 592-593, XP0007905525 ISSN: 0170-9291 (2 pages).
European Patent Office, "Summons to Attend Oral Proceedings Pursuant to Rule 115(1) EPC," issued in connection with European Patent Application No. 10001340.8, dated Feb. 10, 2012 (9 pages).
Fader et al., "Modeling Consumer Choice Among SKU's," Journal of Marketing Research, vol. 33, No. 4, Nov. 1996 (12 pages).
Guadagni et al., "A Logit Model of Brand Choice Calibrated on Scanner Data," Marketing Science, vol. 2, Issue 3, 1983 (2 pages).
Huber et al., "Market Boundaries and Product Choice: Illustrating Attraction and Substitution Effects," Journal of Consumer Research, Inc., vol. 10, No. 1, Jun. 1983 (15 pages).
International Searching Authority, "International Preliminary Report on Patentability," issued in connection with International Patent Application No. PCT/US2010/049645, dated Mar. 27, 2012 (5 pages).
International Searching Authority, "International Search Report," issued in connection with International Patent Application No. PCT/US2010/049645, dated Feb. 28, 2011 (2 pages).
International Searching Authority, "Written Opinion," issued in connection with International Patent Application No. PCT/US2010/049645, dated Feb. 28, 2011 (4 pages).
Kahn et al., "Modeling Choice Among Assortments," Journal of Retailing, vol. 67, No. 3, Fall 1991 (26 pages).
Koppelmann et al, "The Paired Combinatorial Logit Model: Properties, Estimation and Application," Transportation Research Part B, 34, 2000 (15 pages).
Riedesel, Paul, "A Brief Introduction to Discrete Choice Analysis in Marketing Research," Action Marketing Research, 1996, retrieved from <http://www.action-research.com/discrete.html>, retrieved on Jan. 16, 2009 (8 pages).
Sinha et al., "Attribute Drivers: A Factor Analytic Choice Map Approach for Understanding Choices Among SKUs," Marketing Science, vol. 24, No. 3, Summer 2005 (10 pages).
United States Patent and Trademark Office, "Final Office Action," issued in connection with U.S. Appl. No. 12/368,028, dated Jan. 18, 2012, (32 pages).
United States Patent and Trademark Office, "Non-Final Office Action," issued in connection with U.S. Appl. No. 12/368,028, dated Jun. 8, 2011 (16 pages).
United States Patent and Trademark Office, "Final Office Action," issued in connection with U.S. Appl. No. 12/368,028, dated Apr. 16, 2014 (39 pages).
United States Patent and Trademark Office, "Final Office Action," issued in connection with U.S. Appl. No. 12/368,028, dated Aug. 14, 2013 (34 pages).
United States Patent and Trademark Office, "Final Office Action," issued in connection with U.S. Appl. No. 12/476,806, dated Aug. 16, 2012 (17 pages).
United States Patent and Trademark Office, "Final Office Action," issued in connection with U.S. Appl. No. 12/887,027, dated Apr. 11, 2013 (14 pages).
United States Patent and Trademark Office, "Final Office Action," issued in connection with U.S. Appl. No. 13/081,924, dated Jun. 5, 2014 (19 pages).
United States Patent and Trademark Office, "Final Office Action," issued in connection with U.S. Appl. No. 13/081,924, dated Sep. 12, 2013 (19 pages).
United States Patent and Trademark Office, "Non-Final Office Action, " issued in connection with U.S. Appl. No. 12/476,806, dated May 1, 2014 (22 pages).
United States Patent and Trademark Office, "Non-Final Office Action," issued in connection with U.S. Appl. No. 12/368,028, dated Mar. 19, 2013 (33 pages).
United States Patent and Trademark Office, "Non-Final Office Action," issued in connection with U.S. Appl. No. 12/368,028, dated Nov. 26, 2013 (37 pages).
United States Patent and Trademark Office, "Non-Final Office Action," issued in connection with U.S. Appl. No. 12/476,806, dated Dec. 1, 2014 (21 pages).
United States Patent and Trademark Office, "Non-Final Office Action," issued in connection with U.S. Appl. No. 12/476,806, dated Oct. 7, 2011 (15 pages).
United States Patent and Trademark Office, "Non-Final Office Action," issued in connection with U.S. Appl. No. 12/887,027, dated Jan. 15, 2015 (16 pages).
United States Patent and Trademark Office, "Non-Final Office Action," issued in connection with U.S. Appl. No. 12/887,027, dated Apr. 27, 2012 (9 pages).
United States Patent and Trademark Office, "Non-Final Office Action," issued in connection with U.S. Appl. No. 13/081,924, dated Feb. 28, 2013 (15 pages).
United Stapes Patent and Trademark Office, "Non-Final Office Action," issued in connection with U.S. Appl. No. 13/081,924, dated Jan. 15, 2014 (19 pages).
Wen et al., "The Generalized Nested Logit Model," Transportation Research Part B, 35, 2001 (15 pages).
Wikipedia, "Agent-Based Model," retrieved from <http://en.wikipedia.org/w/index.php?title=Agent-based_model&printiable=yes>, retrieved on Jan. 21, 2009 (7 pages).
Wikipedia, "Estimation Theory," retrieved from <http://en.wikipedia.org/w/index.php?title=Estimation_theory&printable=yes>, retrieved on Mar. 15, 2011 (8 pages).
Wikipedia, "Goodness of Fit," retrieved from <http://en.wikipedia.org/w/index.php?title=Goodness_of_fit&printable=yes>, retrieved on Mar. 15, 2011 (4 pages).
Wikipedia, "Independence of Irrelevant Alternatives," retrieved from <http://en.wikipedia.org/w/index.php?title=Independence_of_irrelaevant_alternatives&printable=yes>, retrieved on Feb. 15, 2011 (7 pages).
Wikipedia, "Multinomial Logit," retrieved from <http://en.wikipedia.org/w/index.php?title=Multinomial_logit&printable=yes>, retrieved on Feb. 15, 2011 (3 pages).
Wikipedia, "Revision History of Agent-Based Model," retrieved from <http://en.wikipedia.org/w/index.php?title=Agent-based_model&dir=prev>, retrieved on Jan. 21, 2009 (1 page).
European Patent Office, "Communication Pursuant to Article 94(3) EPC," issued in connection with European Patent Application No. 13151891.2, dated Jun. 1, 2016 (6 pages).
United States Patent and Trademark Office, "Examiner's Answer to Appeal Brief" issued in connection with U.S. Appl. No. 12/368,028, mailed Apr. 21, 2015 (11 pages).

(56) References Cited

OTHER PUBLICATIONS

United States Patent and Trademark Office, "Final Office Action," issued in connection with U.S. Appl. No. 12/476,806, dated Jun. 30, 2015 (21 pages).
International Searching Authority, "International Preliminary Report on Patentability," issued in connection with International Patent Application No. PCT/US2014/026808, dated Sep. 24, 2015 (7 pages).
International Searching Authority, "International Preliminary Report on Patentability," issued in connection with International Patent Application No. PCT/US2014/027812, dated Sep. 24, 2015 (7 pages).
Canadian Intellectual Property Office, "Examiner's Report," issued in connection with Canadian Patent Application No. 2,428,079, dated Oct. 26, 2015 (3 pages).
United States Patent and Trademark Office, "Final Office Action" issued in connection with U.S. Appl. No. 12/887,027, dated Oct. 8, 2015 (21 pages).
Canadian Intellectual Property Office, "Examiner's Report," issued in connection with Canadian Patent Application No. 2,566,943, dated Aug. 12, 2015 (6 pages).
United States Patent and Trademark Office, "Notice of Allowance," issued in connection with U.S. Appl. No. 13/283,495, dated Jun. 8, 2016 (7 pages).
United States Patent and Trademark Office, "Notice of Allowance," issued in connection with U.S. Appl. No. 13/740,699, dated Dec. 8, 2015 (17 pages).
United States Patent and Trademark Office, "Non-Final Office Action," issued in connection with U.S. Appl. No. 13/283,495, dated Nov. 23, 2015 (8 pages).
Geyer-Schulz, "On Learning in a Fuzzy Rule-Based Expert System," Supplement to Kybernetika, vol. 28, 1992, downloaded from www.kybernetika.cz/content/1992/7/33/paper.pdf, Nov. 24, 2015 (4 pages).
United States Patent and Trademark Office, "Non-Final Office Action," issued in connection with U.S. Appl. No. 14/211,788 dated Apr. 27, 2016 (8 pages).
United States Patent and Trademark Office, "Final Office Action," issued in connection with U.S. Appl. No. 14/208,013 dated Feb. 14, 2017 (66 pages).
United States Patent and Trademark Office, "Final Office Action," issued in connection with U.S. Appl. No. 14/211,788 dated Oct. 4, 2016 (11 pages).
United States Patent and Trademark Office, "Notice of Allowance and Fee(s) Due", issued in connection with U.S. Appl. No. 14/208,013, dated Jun. 2, 2017, 63 pages.
Brintrup et al., "Ergonomic Chair Design by Fusing Qualitative and Quantitative Criteria Using Interactive Genetic Algorithms," IEEE Transactions on Evolutionary Computation, vol. 12, No. 3, Jun. 2008, 12 pages.
Hudson et al, "The Application of Genetic Algorithms to Conceptual Design," AI System Support for Conceptual Design, Springer London, 1996, 20 pages.
Quiroz et al., "Towards Creative Design Using Collaborative Interactive Genetic Algorithms," 2009 IEEE Congress on Evolutionary Computation, Aug. 26, 2009, 8 pages.
Yang et al, "Development of a Product Configuration System with an Ontology-Based Approach," Computer-Aided Design, vol. 40, No. 8, Aug. 2008, 16 pages.
United States Patent and Trademark Office, "Non-Final Office Action" issued in connection with U.S. Appl. No. 14/208,013, dated Sep. 8, 2016, 14 pages.

United States Patent and Trademark Office, "Notice of Allowance and Fee(s) Due", issued in connection with U.S. Appl. No. 14/211,788, dated Jun. 21, 2017, 50 pages.
United States Patent and Trademark Office, "Patent Board Decision", issued in connection with U.S. Appl. No. 14/559,084, dated Jun. 21, 2017, 8 pages.
United States Patent and Trademark Office, "Examinar's Answer", issued in connection with U.S. Appl. No. 14/559,084, dated May 3, 2016, 5 pages.
United States Patent and Trademark Office, "Final Office action", issued in connection with U.S. Appl. No. 14/559,084, dated Jul. 17, 2015, 8 pages.
United States Patent and Trademark Office, "Non-Final Office action ", issued in connection with U.S. Appl. No. 14/559,084, dated Mar. 11, 2015, 26 pages.
United States Patent and Trademark Office, "Decision on Appeal", issued in connection with U.S. Appl. No. 12/368,028, mailed on Aug. 11, 2017, 17 pages.
Terano et al., "Marketing Data Analysis Using Inductive Learning and Genetic Algorithms with Interactive- and Automated-Phases," Evolutionary Computation, 1995, IEEE International Conference on Perth, Volume , Nov. 29, 1995 (6 pages).
International Searching Authority, "International Search Report and Written Opinion," issued in connection with International Patent Application No. PCT/US2014/026808, dated Jun. 26, 2014 8 pages).
European Patent Office, "Extended Search Report," issued in connection with European Patent Application No. 13151891.2, dated Sep. 27, 2013 (5 pages).
Fry et al. Testing for Independence of Irrelevant Alternatives: Some Empirical Results, Feb. 1998, Sociological Methods & Research, vol. 26, pp. 401-423 (Year: 1998).
Dow et al. Multinomial Probit and Multinomial Logit: A comparison of Choice Models for Voting Research, 2003 Electoral Studies, vol. 23, pp. 107-122 (Year: 2003).
United States Patent and Trademark Office, "Notice of Allowance ", issued in connection with U.S. Appl. No. 15/680,939, dated Aug. Feb. 25, 2019, 56 pages.
United States Patent and Trademark Office, "Non-Final Office Action", issued in connection with U.S. Appl. No. 15/680,939, dated Jun. 22, 2018, 18 pages.
United States Patent and Trademark Office, "Final Office Action," issued in connection with U.S. Appl. No. 15/730,336, dated Feb. 26, 2020, 8 pages.
United States Patent and Trademark Office, "Advisory Action," issued in connection with U.S. Appl. No. 15/730,336, dated May 11, 2020, 2 pages.
United States Patent and Trademark Office, "Notice of Allowance," issued in connection with U.S. Appl. No. 15/728,100, dated Apr. 10, 2020, 11 pages.
Indian Patent Office, "Examination Report," issued in connection with application No. 625/KOLNP/2012, dated Jul. 7, 2020, 2 pages.
United States Patent and Trademark Office, "Notice of Allowance and Fee(s) Due," issued in connection with U.S. Appl. No. 15/728,100, dated Aug. 6, 2020, 8 pages.
United States Patent and Trademark Office, "Non Final Office Action," issued in connection with U.S. Appl. No. 15/728,100, dated Jul. 25, 2019, 21 pages.
United States Patent and Trademark Office, "Non-Final Office Action," issued in connection with U.S. Appl. No. 15/730,336, dated Jul. 30 2019, 7 pages.

\* cited by examiner

FIG. 4

US 11,037,179 B2

METHODS AND APPARATUS TO MODEL CONSUMER CHOICE SOURCING

CROSS-REFERENCE TO RELATED APPLICATIONS

This patent arises from a continuation of U.S. patent application Ser. No. 15/680,939, which is entitled "METHODS AND APPARATUS TO MODEL CONSUMER CHOICE SOURCING", and which was filed on Aug. 18, 2017, which is a continuation of U.S. patent application Ser. No. 14/559,084, which is entitled "METHODS AND APPARATUS TO MODEL CONSUMER CHOICE SOURCING", and which was filed on Dec. 3, 2014, which is a continuation of U.S. patent application Ser. No. 13/081,924, which is entitled "METHODS AND APPARATUS TO MODEL CONSUMER CHOICE SOURCING" and which was filed on Apr. 7, 2011, the contents of which are expressly incorporated by reference herein in their entireties for all purposes.

FIELD OF THE DISCLOSURE

This disclosure relates generally to market research and, more particularly, to methods and apparatus to model consumer choice sourcing.

BACKGROUND

Choice modeling techniques allow market researchers to assess consumer behavior based on one or more stimuli. Consumer preference data is collected during the one or more stimuli, such as a virtual shopping trip in which consumers are presented with any number of selectable products (e.g., presented via a kiosk, computer screen, slides, etc.). The consumer preferences associated with products may be referred to as utilities, which may be the result of one or more attributes of the product. While choice modeling allows market researchers to predict how one or more consumers will respond to the stimuli, such analysis techniques typically assume that each item in a virtual shopping trip is equally substitutable relative to all other items available to the consumer.

BRIEF DESCRIPTION OF THE DRAWINGS

FIG. 4 is a portion of an example aggregate model structure generated by the example aggregate logit sourcing engine of FIGS. 1 and 2.

DETAILED DESCRIPTION

Figure 1:
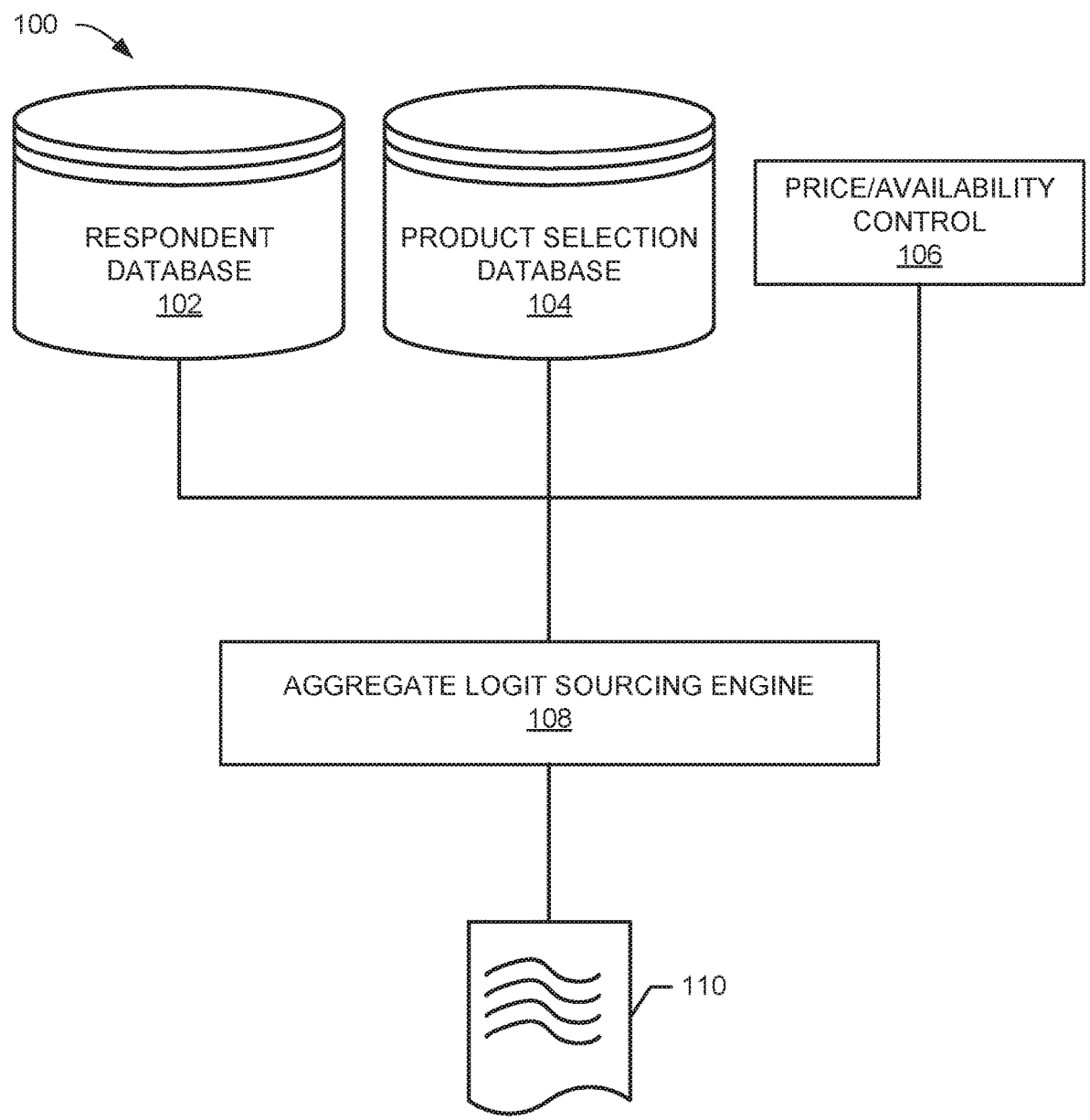
FIG. 1 is a schematic illustration of an example system to model consumer choice sourcing.

Methods and apparatus are disclosed to model consumer choices. An example method includes identifying a set of products, receiving respondent choice data associated with the set of products, and adding the set of products to a base multinomial logit (MNL) model. The example method also includes generating, with a programmed processor, a number of copies of the MNL model to form an aggregate model based on a number of products in the set, each copy including an item utility parameter for each product in the set of products, and creating a matrix structure based on the number of products in the set, the matrix structure to be subtracted from each item utility parameter in the aggregate model. Further, the example method includes estimating each item utility parameter of the aggregate model and the matrix structure based on the number of copies of the MNL model and the respondent choice data, and calculating a choice probability based on each of the estimated utility parameters.

Market researchers, product promoters, marketing employees, agents, analysts, and/or other people and/or organizations chartered with the responsibility of product management (hereinafter collectively referred to as "analysts") typically attempt to justify informal and/or influential marketing decisions using one or more techniques that predict sales of one or more products of interest. Accurate forecasting models are useful to facilitate these decisions. In some circumstances, a product may be evaluated by one or more research panelists/respondents, which are generally selected based upon techniques having a statistically significant confidence level that such respondents accurately reflect a given demographic of interest. Techniques to allow respondents to evaluate a product, which allows the analysts to collect valuable choice data, include focus groups and/or purchasing simulations that allow the respondents to view and evaluate product concepts (e.g., providing images of products on a monitor, asking respondents whether they would purchase the products, discrete choice exercises, etc.).

The methods and apparatus described herein include, in part, one or more modeling techniques to facilitate sales forecasting and allow analysts to make informed marketing decisions. The modeling techniques described herein may operate with one or more modeling techniques, consumer behavior modeling, and/or choice modeling.

Generally speaking, choice modeling is a method to model a decision process of an individual in a particular context. Choice models may predict how individuals will react in different situations (e.g., what happens to demand for product A when the price of product B increases/decreases?). Predictions with choice models may be made over large numbers of scenarios and are based on the concept that people choose between available alternatives in view of one or more attributes of the products (e.g., price, size, tradedress, feature(s), etc.). For example, when presented with a choice to take a car or bus to get to work, each of the alternative choices may be separated into three example attributes: price, time and convenience. For each attribute, a range of possible levels may be defined, such as three levels of price (e.g., $0.50, $1.00 or $1.50), two levels of time (e.g., 5 minutes or 20 minutes, corresponding to two attributes of "convenient" or "not-convenient," respectively). In the event a transportation mode exists that is cheapest, takes the least amount of time and is most convenient, then that transportation mode is likely to be selected. However, tradeoffs exist that cause a consumer to make choices, in which some consumers place greater weight on some attributes over others. For some consumers, convenience is so important that price has little effect on the choice, while other consumers are strongly motivated by price and will endure greater inconvenience to acquire the lowest price.

In the context of store, retail, and/or wholesale purchases, analysts may wish to model how a consumer chooses among the products available. Alternatives may be decomposed into attributes including, but not limited to product price, product display, or a temporary price reduction (TPR), such as an in-store marketing promotion that prices the product lower than its base price. Although the methods and apparatus described herein include price, display and/or TPR, any other attributes may be considered, without limitation. Additional or alternative attributes may include brand or variety. When making a purchase decision, consumers balance the attributes (attribute utilities), such as brand preferences balanced with the price and their attraction for displays and/or TPRs, thereby choosing the product that maximizes their overall preference.

Although choice modeling techniques offer analysts an opportunity to employ a multinomial logit (MNL) model to predict probabilities of different consumer purchasing behaviors, use of the MNL, model requires analyst discretion when selecting candidate available products from which a customer may choose. As used herein, the term "sourcing" refers to a degree of product differentiation within a set of available products from which a consumer may choose. For example, the MNL model assumes that any choices a customer may select within a set of products are equally substitutable for each other, which is sometimes referred to as fair share sourcing. In circumstances where the list of available products includes similar products, such as a choice between Coke®, Pepsi® and RC Cola®, the degree of substitutability may be relatively high. That is, in the event the original list of available cola products removed RC Cola® as an available selection for the consumer, then the remaining available products (i.e., Coke® and Pepsi®) are likely considered realistic substitutes for each other based on, for example, comparison(s) to observed respondent behavior(s).

In other examples, if the analyst desires to study a group of products in which one or more of the available products is not a suitable substitute, then the MNL model exhibits output error when calculating and/or otherwise predicting probabilities of different consumer purchasing behaviors. For instance, if the analyst arranges a set of available products to include Coke®, Pepsi® and Sprite®, then the MNL model assumes that each of those available products is deemed to be equally substitutable for the other product in the event that one or more of the selection choices become unavailable. If Pepsi® were removed from the list of available choices, then the MNL model calculates the probability of remaining choice selection as though Coke® and Sprite® were equally substitutable for each other and/or otherwise preferred by the consumer. This inherent limitation of the MNL model is sometimes referred to as an independence of irrelevant alternatives (IIA) property, in which the MNL modeltreats all product sourcing as fair share (equal) sourcing where all sourcing e.g., any product) is equally substitutable to any other available product(s) under consideration.

Efforts to minimize the negative effects of the IIA property include implementing variants to the MNL model and/or logit models in general. Example variants include a probit (multinomial probit) model and/or a nested logit model. These variants do not exhibit the negative effects of the IIA property. However, while the nested logit does not suffer the negative effects of the IIA property, such models require analyst discretion when forming one or more groups of available products under study. In other words, the MNL model and the nested logit model cannot model complex sourcing scenarios that may reflect real-world product availability combinations that consumers experience. For situations in which the analyst wishes to identify respondent behaviors for a whole category of products (e.g., beverages), a realistic product mix may not be possible when the products of a set of products cannot be considered valid substitutes for each other. Additionally, while the multinomial probit model may handle complex sourcing scenarios, the multinomial probit model does not apply a closed-form formula to calculate choice probabilities, thereby requiring substantial numerical integration and time. For example, multinomial probit models having more than ten (10) to fifteen (15) parameters (e.g., products of interest to study) could require days or weeks of computation time.

The methods and apparatus disclosed herein permit an analyst to consider complex sourcing product arrangements to calculate choice probabilities using a closed-form approach. At least one benefit of the methods and apparatus described herein includes realization of a computational efficiency improvement on one or more computing resources used to calculate choice probabilities using respondent choice data.

FIG. 1 is a schematic illustration of a system 100 to model consumer choice sourcing. In the illustrated example of FIG. 1, the system 100 includes a respondent database 102, a product selection database 104 and price/availability control 106, each of which are inputs to an aggregate logit sourcing (ALS) engine 108. In operation, the example ALS engine 108 calculates one or more choice probabilities 110 based on choice exercise data from the respondent database 102. Additionally, the one or more of the choice probabilities 110 calculated by the ALS engine 108 may be tailored in connection with one or more simulated price points and availability variations identified with the example price/availability control 106.

Figure 2:
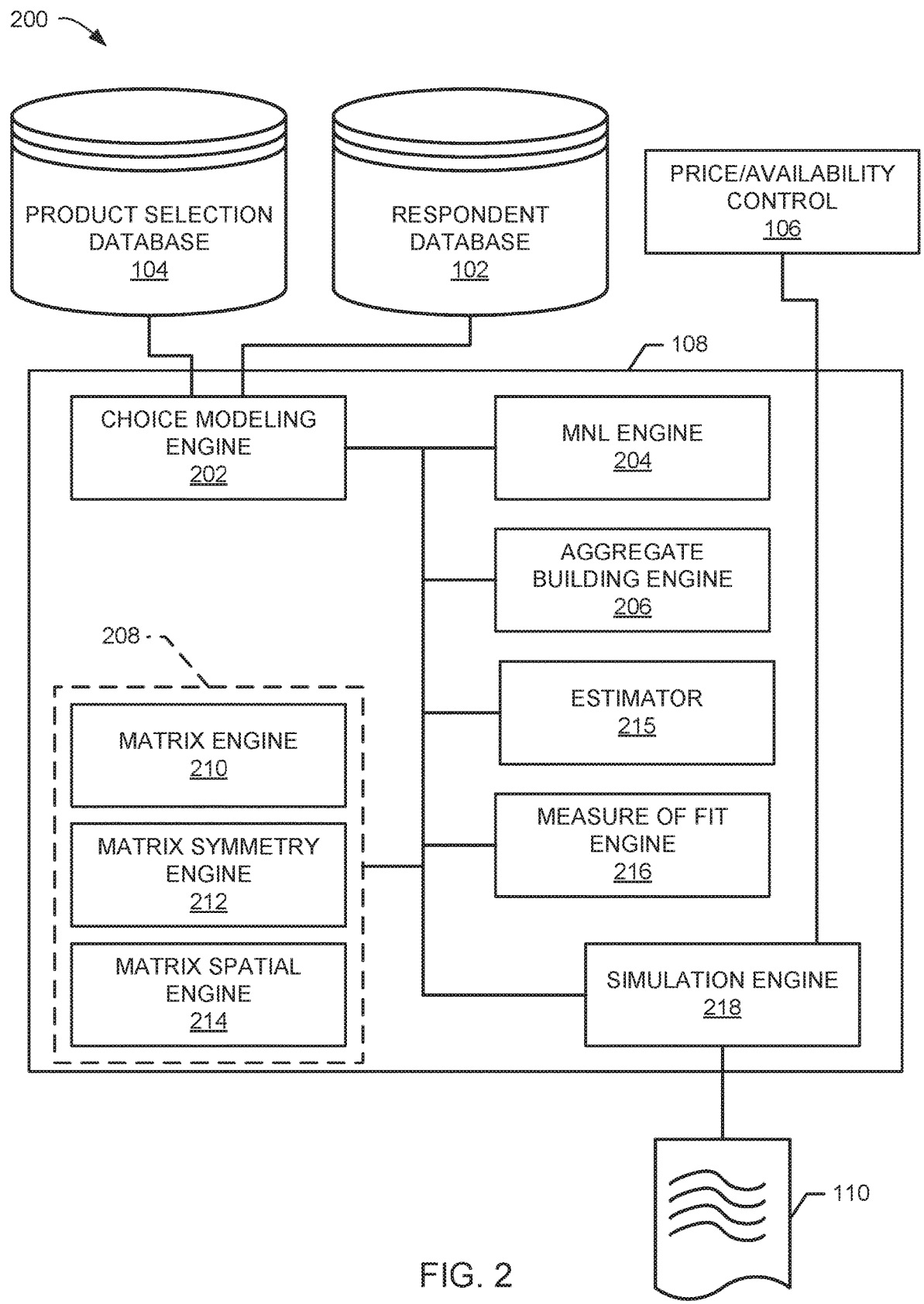
FIG. 2 is a schematic illustration of an example aggregate logit sourcing engine of the example system of FIG. 1.

FIG. 2 is a schematic illustration of the example ALS engine 108 of FIG. 1. In the illustrated example of FIG. 2, the ALS engine 108 includes a choice modeling engine 202, a multinomial logit (MNL) engine 204, an aggregate building engine 206 and a sourcing modifier 208. The example sourcing modifier 208 includes a matrix engine 210, a matrix symmetry engine 212 and a matrix spatial engine 214. In operation, one or more models generated by the aggregate building engine 206 employ data from one or more choice modeling exercises during a modeling estimation performed by an example estimator 215 to calculate model parameters. The calculated model parameters from the one or more generated models are compared to the data from the choice modeling engine 202 by a measure of fit engine 216 to determine how well the parameters fit the choice data. In some examples, the measure of fit engine 216 employs a likelihood ratio test, but other types of techniques may be employed to determine whether the model parameters fit with the choice data. As described in further detail below, if the example measure of fit engine 216 determines that the model parameters do not fit the choice data, then the example sourcing modifier 208 may employ one or more alternate matrix structure(s) to calculate parameter offset value(s).

Calculated model parameters that result in an acceptable measure of fit indicate that the one or more models developed by the aggregate engine 206 may be used for one or more market simulation(s). Market simulation(s) may be calculated by a simulation engine 218, which uses one or more product specific price points and product availability measures from the price/availability control 106 to generate the choice probabilities 110. For example, an analyst may establish a first price point for each of the products Coke®, Pepsi® and Sprite® to allow the example simulation engine 218 to calculate choice probabilities for each of those products of interest. Additionally, the analyst may change one or more price points to a second price point (e.g., make Coke® more expensive) to observe how the choice probabilities are affected.

Unlike one or more other models and/or modeling techniques employed to calculate choice probabilities, the example ALS engine 108 generates a model having a closed form. Closed form models perform significantly faster when compared to iterative modeling approaches, such as a multinomial probit model that can require days or weeks of computation time when a relatively small number of products (e.g., ten) of interest is studied. Additionally, the systems, methods, apparatus and/or articles of manufacture disclosed herein minimize the negative effects of the IIA property when calculating choice probability values for groups of products that may not be deemed substitutable to each other, but that may be a realistic product mix that a consumer would experience when shopping. While the MNL model suffers negative effects of the IIA property, the aggregate modeling approach disclosed herein generates a number of sub-models to form an aggregate model. Each sub-model, alone, is bound by the IIA property. However, each of the sub-models is associated with a matrix structure having an offset value to represent complex and diversified sourcing possibilities so that the aggregate sum of the sub-models is unaffected by the IIA property.

In operation, the example choice modeling engine 202 receives information related to an assortment of products that is to be studied from the example product selection data (database) 104. Generally speaking, respondents that participate in one or more choice modeling exercises are presented with any number of selectable products (e.g., presented via a kiosk, computer screen, slides. etc.). A number of products are shown multiple times to each respondent, in which one or more attributes of the products may change during each instance of viewing. Each virtual shopping trip displays a virtual shelf with a range of products that are organized in a manner to reflect what the respondent would see if at a retail store, for example. The choices made by the respondents during the virtual shopping trips are stored in the respondent database 102. Unlike virtual shopping trips conducted when employing the MNL model, the example ALS engine 108 avoids the need to capture analyst subjective input regarding opinions of which products are deemed proper substitutes for each other for placement on the virtual shelf. Reliance upon analyst discretion places limitations on statistical repeatability, accuracy and legitimacy of the products and/or subcategories chosen by the analyst.

Instead, the systems, methods, apparatus and/or articles of manufacture disclosed herein allow one or more subsets of the selectable products to be presented on the virtual shelf, in which the subsets are tailored to be displayed in a manner that addresses one or more questions by the client and/or analyst. For instance, a client may be interested in the choice probabilities of RC Cola® when placed near other available cola products. On the other hand, the client may be interested in the choice probabilities of RC Cola® when placed near other soft drinks in general, and/or when placed near energy drinks. In still other examples, virtual shopping trips prompt respondents to select from a range of products from one or more categories (e.g., dental products, baby food products, hair care products, laundry products, etc.) to determine choice probability values for the products within that category.

After the example choice modeling engine 202 obtains choice data from the respondents in view of the selection of products used in the virtual shopping trip(s), the choice data is stored in the example respondent database 102. The example MNL engine 204 builds an MNL model having a structure based on the number of items used in the choice modeling exercise (virtual shopping trip). Typically, to prevent respondent fatigue during the choice modeling exercise, the number of products for their consideration is limited to eighty (80), but any other number of products may be used with the example systems, methods, apparatus and/or articles of manufacture disclosed herein.

Figure 3:
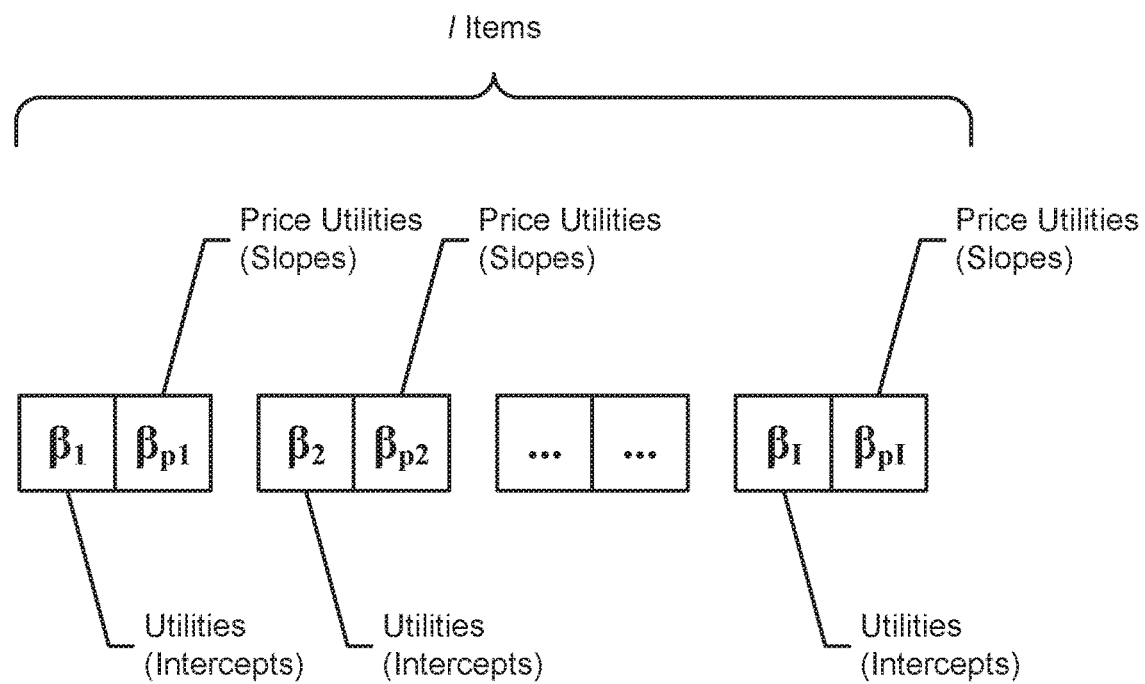
FIG. 3 is an example multinomial logit model generated by the example aggregate logit sourcing engine of FIGS. 1 and 2.

FIG. 3 is a portion of an example MNL model structure 300 that may be generated by the example MNL engine 204. In the illustrated example of FIG. 3, the MNL model structure 300 represents a number of items equal to a corresponding number of products to be evaluated, which is indicated by the variable I. Each item (I) of the MNL model structure 300 may include any number of corresponding parameters ($\beta$), such as item utilities ($\beta_I$) (e.g., intercepts) and price utilities ($\beta_P$) (e.g., slopes). As used herein, a utility represents a preference magnitude in which a higher utility corresponds to a higher preference. Utility values may represent a general preference for a product, or may represent a preference for a specific product from a specific respondent. Without limitation, utilities may indicate a preference in view of one or more product attributes and/or price. For instance, a price utility may increase when the price for a product decreases. In another example, the price utility for a product may increase when the price of a competing product increases.

A closed-form of the MNL model structure 300 may be represented by example Equation 1.

$$C_i = \frac{e^{[\beta_i + \beta_{pi}\$]}}{\sum_j e^{[\beta_j + \beta_{pj}\$_j]}}. \qquad \text{Equation 1}$$

In the illustrated example of Equation 1, $C_i$ represents the choice probability for the $i^{th}$ item (I), $\beta_i$ represents an item utility for the $i^{th}$ item (I), $\beta_{pi}$ represents a price utility for the $i^{th}$ item (I), $ represents a price of an item, and j represents the set of all items for the MNL model. Expressions of price may occur and/or otherwise be represented in any manner including, but not limited to a retail price, a base price, a geographical price average, an index to a base price, a logarithm of the price index, etc. As described above, although MNL modeling facilitates the calculation of choice probabilities with a closed-loop formula, thereby simplifying calculation efforts, the MNL model typically employs a set of products of interest that are deemed substitutable for each other due to the potential negative effects of the IIA property. Such limitations inherent in the MNL model hamper efforts to study complex sourcing patterns that may be exhibited and/or experienced by consumers when shopping. In other words, a consumer is not typically exposed to a set of equally substitutable products on a store shelf when shopping, rather, the consumer is typically presented with substantially more variety when reviewing one or more retail shelves.

Figure 4:
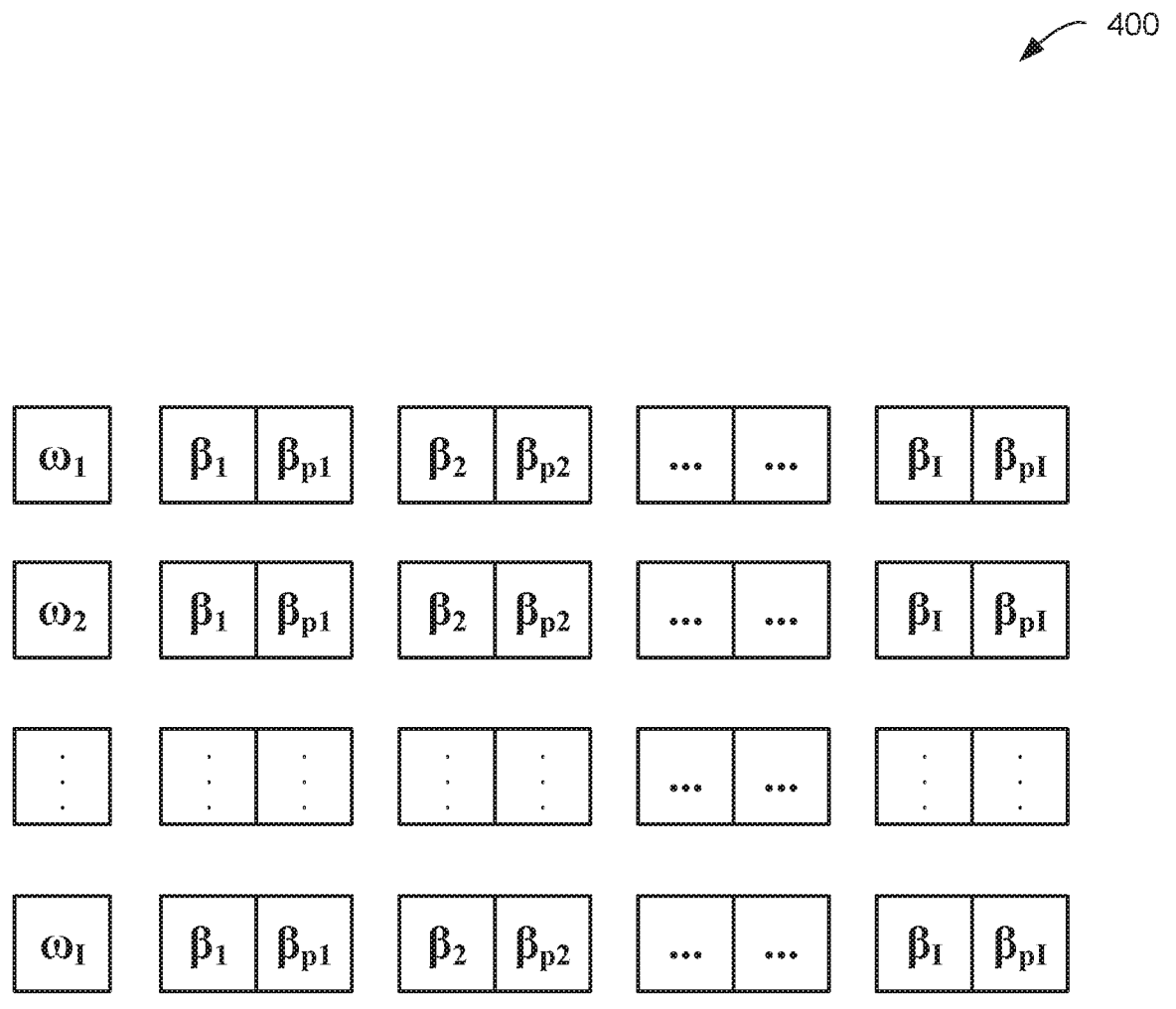

FIG. 4 is a portion of an example aggregate model structure 400 that may be generated by the example aggregate building engine 206. In the illustrated example of FIG. 4, the aggregate building engine 206 generates a number of copies of the MNL model structure 300 based on the number of items (I) (i.e., products of interest) to minimize the effects of the IIA property and allow an analyst to study a set of products that may not necessarily be deemed similar to each other. Each copy of the MNL model structure 300 generated by the example aggregate building engine 206 is a submodel. The number of sub-models is based on the number of items (I), thereby generating I rows, and each row includes I parameters ($\beta_X$) (e.g., utilities). The sub-models generated by the example aggregate building engine 206 are identical to each other, except for a weighting parameter W associated with each sub-model. Each weighting parameter W may be calculated in a manner consistent with example Equation 2.

$$W_S = \frac{e^{\beta_S}}{\sum_j e^{\beta_j}}.$$ Equation 2

In the illustrated example of Equation 2, S represents an indication of each row (sub-model) of the aggregate model structure 400 of FIG. 4, $\beta_S$ represents a parameter associated with the $S^{th}$ sub-model, and the denominator of example Equation 2 represents the sum of exponentiated parameters for the aggregate model structure 400 of FIG. 4. Choice probability values for each item (i) of the set of items (I) may be calculated in a manner consistent with example Equation 3.

$$C_i = \sum_S W_S \frac{e^{[\beta_1 + \beta_{pi}\$_i]}}{\sum_j e^{[\beta_j + \beta_{pj}\$_j]}}.$$ Equation 3

Figure 5:
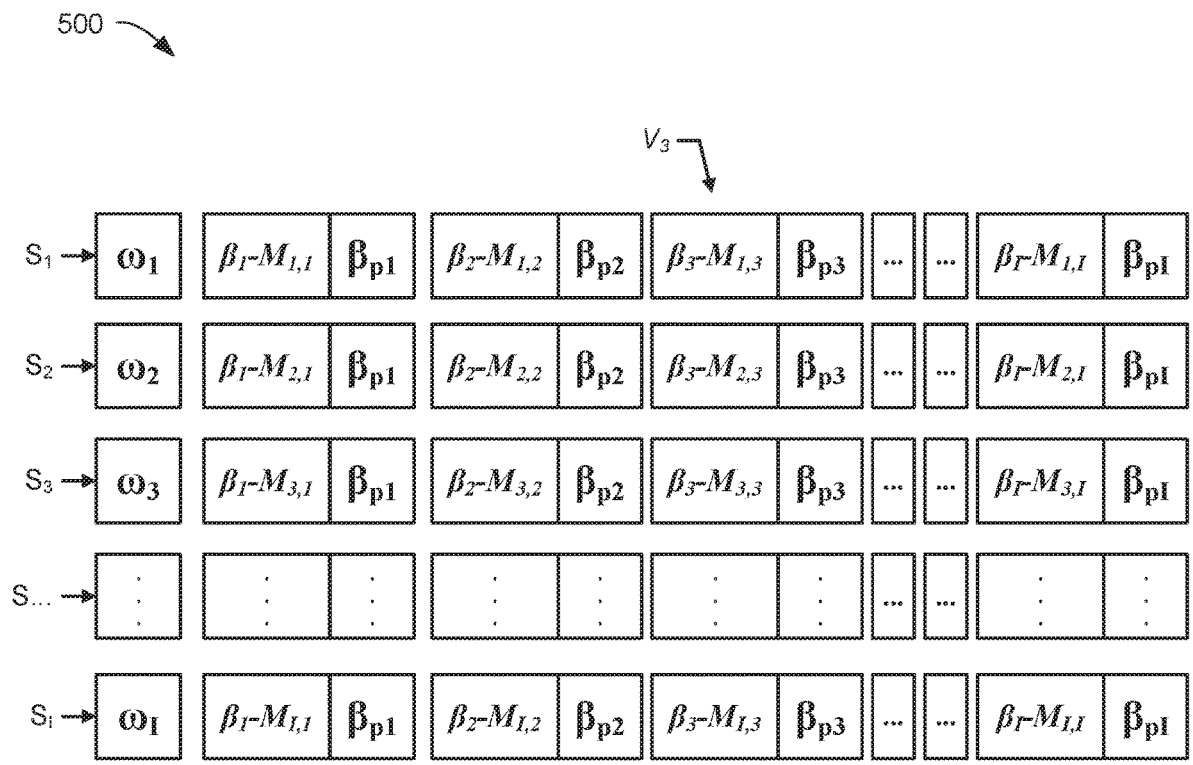
FIG. 5 is a portion of an example matrix infused aggregate model structure generated by the example aggregate logit sourcing engine of FIGS. 1 and 2.

The example sourcing modifier 208 builds upon the example aggregate model structure 400 of FIG. 4 by generating a matrix structure that identifies and/or otherwise calculates a parameter offset value for one or more of the parameters ($\beta_X$), which is shown in FIG. 5 as a portion of an example matrix infused aggregate model structure 500. In the illustrated example of FIG. 5, the aggregate building engine 206 generates matrix placeholders ($M_{I,I}$) and incorporates them into each sub-model (rows $S_1$, $S_2$, . . . , $S_1$). Each matrix placeholder ($M_{I,I}$) includes a matrix location coordinate and may be used to identify a matrix value from the example sourcing modifier 208. In operation, the matrix placeholders ($M_{I,I}$) facilitate a manner in which one or more sourcing scenarios can be incorporated into the aggregate model structure 400 and to allow the analyst to study a greater variety of products of interest (e.g., the choice share effects between products when prices and/or availability values change). In other words, the matrix placeholders ($M_{I,I}$) allow the aggregate model structure 400 to consider the effects of all products of interest on a first one of those products by subtracting a representation of sourcing effects from the preference parameter of the first product. For example, if the first product of interest is Coke® and the products of interest include other soft drinks, such as Pepsi® and Sprite®, then a sourcing effect from Pepsi® has a greater relative impact on Coke® than a sourcing effect from Sprite®. In other words, changes in availability and price for Pepsi® will have a greater effect on the choice probability associated with Coke®, but changes in availability and price for Sprite® will have a lesser effect on the choice probability associated with Coke®.

The representations of sourcing effects for each of the products of interest (i.e., the set of items I) are generated by the example matrix engine 210. In operation, the example matrix engine 210 generates and/or otherwise forms a matrix having dimensions of (I×I), with each cell within the I×I matrix having a parameter value to represent a sourcing effect for an item (i) within the set of items (I). For example, if the set of items I includes eighty (80) products to be studied by the analyst and/or otherwise requested by a client, then the example matrix engine 210 generates a matrix that is eighty columns by eighty rows (80×80). The example I×I matrix generated by the matrix engine 210 provides a manner of aggregation of sub-model sourcing adjustments so that the IIA property does not bias resulting choice probability calculations when analysts and/or clients select diverse product sets.

An example I×I matrix may be referred to as a straight matrix in which each matrix element corresponds to an intersection of two products from the set (I). However, the matrix diagonal will always include a value of zero because the diagonal reflects a comparison between a product and itself. The intersection of each non-diagonal row and column represents two products and reflects a degree of similarity between those two products. Values for each matrix element may be constrained in a manner consistent with example Equations 4 and 5.

$M_{S,S}=0$ Equation 4.

$M_{S,V} \geq 0 (S \neq V)$ Equation 5.

In the illustrated example of Equation 4, diagonal elements are zero, which reflects matrix cells where the row and column represent the same product. In the illustrated example of Equation 5, all non-diagonal matrix elements are constrained to positive values greater than or equal to zero. Matrix placeholders are inserted into the aggregate model structure 500 after each item utility parameter. Each matrix placeholder includes a coordinate that is mapped to the aggregate model structure 500 based on matching matrix rows to structure 500 rows (e.g., S values) and matching matrix columns to structure 500 columns (e.g., V values).

Considering an example choice modeling exercise that includes Coke® soft drinks, Pepsi® soft drinks and Sprite® soft drinks, the illustrated example matrix infused aggregate model structure 500 may reveal a first item (row $S_1$) with Coke®, a second item (row $S_2$) with Pepsi®, and a third item (row $S_3$) with Sprite®. Additionally, corresponding parameters denoted with "1", "2," and "3" reflect Coke®, Pepsi® and Sprite® products, respectively. In view of the instant example, parameters $\beta_1$, $\beta_2$ and $\beta_3$ refer to an indication of the preference that the respondent pool has for the corresponding brands of soft drink. From a substitution point of view, assume that the choice selections from the respondent database 102 identify that Coke® and Pepsi® are more substitutable for each other, while Sprite® is not deemed a common and/or otherwise observed substitute for the products of Coke® and Pepsi®. As such, if the price of Coke® increases, then a corresponding choice probability that Pepsi® will be purchased to a greater degree will increase.

On the other hand, price and/or availability fluctuations of Sprite® have substantially less effect on the products Coke® and/or Pepsi®.

Matrix index value $M_{(I,I)}$ reflects a preference of Coke® on itself, which is constrained by example Equation 4 to equal zero. Accordingly, the example matrix infused aggregate model structure 500 does not modify the sourcing behavior from $\beta_i$ in row $S_i$ (see row $S_1$, column $V^1$ of the example matrix infused aggregate model structure 500). On the other hand, matrix index value $M_{(1,2)}$ reflects a relative degree of similarity between Coke® and Pepsi® and matrix index value $M_{(1,3)}$ reflects a relative degree of similarity between Coke® and Sprite®. The value for index value $M_{(1,2)}$ based on the example assumptions that Coke® and Pepsi®) are deemed significantly more substitutable for each other as compared to Coke® and Sprite® and/or Pepsi® and Sprite®, will be relatively low(e.g., values closer to zero are indicative to a greater degree of similarity). That is, the sourcing effects of the preference of Pepsi® ($\beta_2$) are significantly affected by price arid/or availability metrics associated with Coke®, as shown by the subtraction of the sourcing modifier indicative of the Coke®/Pepsi® matrix intersection ($M_{(1,2)}$) from the preference parameter associated with Pepsi® ($\beta_2$) (see row $S_1$, column $V_2$ of the example matrix infused aggregate model structure 500).

On the other hand, matrix index value $M_{(1,3)}$ is relatively high because it reflects a relative degree of similarity (or lack thereof) between Coke® and Sprite. The effects of the relationship between Coke® and Sprite® are evident in the example matrix infused aggregate model structure 500 in row $S_1$, column $V_3$ where the relatively high value for the sourcing modifier indicative of the Coke®/Sprite® matrix intersection ($M_{(1,3)}$) is subtracted from the preference parameter associated with Sprite® ($\beta_3$). In the event that a price and/or availability metric for Coke® changes, the effect on Sprite® will have a lower impact on the resulting choice probability. Unlike a traditional MNL model, in which all products under consideration are treated as equal substitutes for each other, the example methods, apparatus, systems and/or articles of manufacture disclosed herein apply a matrix placeholder ($M_{(1,1)}$) having a corresponding offset value to proportionally affect choice probability calculations in a manner consistent with actual market and/or customer experiences.

Values for each of the matrix cells, and values for each of the parameters of the matrix infused aggregate model structure 500 (e.g., $\beta_1$, $\beta_{P1}$, $\beta_2$, $\beta_{P2}$ etc.) are calculated by iteratively estimating the matrix infused aggregate model structure 500 with the choice data stored in the example respondent database 102. As disclosed above, the respondent database 102 stores choice selections from respondents during a choice modeling exercise, in Which the respondents engage in virtual shopping trips Where the set of items (I) (products) are presented via virtual shelves. Initial values for each of the matrix cells and/or parameters may be set at random, predetermined values, or set via a random number generator, in which the estimation process allows the matrix cell values and parameters to converge. After the estimation process completes, in which the matrix cell values and parameters converge, the choice probability may be calculated via a closed-form approach in a manner consistent with example Equation 6.

$$C_i = \sum_S W_S \frac{e^{[\beta_i - M_{s,i} + \beta_{pi}\$_i]}}{\sum_j e^{[\beta_j - M_{s,j} + \beta_{pj}\$_j]}}. \qquad \text{Equation 6}$$

In some examples, the parameters associated with price (price utilities/preferences) may be modified to facilitate scaling and address sub-model sensitivity. For example, each price utility (e.g., $B_{p1}$) may include a scaling price parameter ($\beta_{p'1}, \beta_{p'2}, \beta_{p'3}, \ldots, \beta_{p's}$) for each row of the example matrix infused aggregate model structure 500. The choice probability may be calculated via a closed-form approach in a manner consistent with example Equation 7.

$$C_i = \sum_S W_S \frac{e^{[\beta_i - M_{s,i} + (\beta_{pi} + \beta_{p's})\$_i]}}{\sum_j e^{[\beta_j - M_{s,j} + \beta_{pj} + B_{p's})\$_j]}}. \qquad \text{Equation 7}$$

As described above, the example estimator 215 performs an iterative estimation using the model and data collected from the respondent choice exercise. Generally speaking, values of the parameters of the example model, such as the model represented by the closed-form choice probability of example Equation 7 and/or the example matrix infused aggregate model structure 500, are estimated based on measured and/or empirical data. The example estimator 215 may employ one or more estimation methods including, but not limited to a maximum likelihood method, a Bayes estimation method and/or a minimum mean squared error. To ascertain whether any number of estimation iterations converge to acceptable parameter values, the example measure of fit engine 216 employs a fitting test (e.g., a likelihood ratio test, etc.) to determine how well the choice data fits with the converged parameters of the model (e.g., the example matrix infused aggregate model structure 500) In the event that the model parameters converge, but do not fit the choice data to an acceptable degree, the example measure of fit engine 216 employs the example sourcing modifier 208 to apply one or more alternate matrix structures to calculate the parameter offset value(s) (e.g., $M_{(I,I)}$). In other examples, the measure of fit engine 216 employs one or more fitting tests during each iteration. In the event that successive iterations do not improve by a threshold amount, then current parameter values may be accepted as final. However, in the event that successive iterations that continue to illustrate improvement beyond a threshold value, then the one or more iterations may continue to develop parameter value(s).

As described above, the matrix structure is based on the number of product of interest (items) to be studied. The methods, apparatus, systems and/or articles of manufacture disclosed herein generate one or more matrix structures to reflect effects of sourcing behaviors on all products of interest under consideration. Sourcing behaviors, which are facilitated by matrix cell values (parameters), are subtracted from each product utility in a mariner that is proportional to a degree of similarity between one or more other products. A straight matrix is generated by the example matrix engine 210 by assigning an equal number of matrix rows and columns to form a square I×I matrix. For example, if eighty (80) products of interest are selected for the choice modeling exercise, then the example matrix engine 210 generates an 80×80 square matrix and populates each matrix cell at a matrix placeholder $M_{(I,I)}$ having a parameter and a parameter value. Each row of the straight matrix represents one of the eighty (80) items, and each column represents the same set of eighty (80) items in the same order. In other examples, a matrix is formed in connection with one or more subcategories, as described in further detail below. The diagonal of the matrix reflects intersections of the product with itself, and is set to zero. However, each off-diagonal placeholder represents an intersection indicative of a relationship between one product and another product (e.g., a degree of similarity). During the model estimation, the example estimator 215 iteratively estimates both the model parameters and the parameters of the straight matrix so that each parameter converges to a value. Initial values for all model and/or matrix parameters may be initially set at a random number, zero and/or any other value before converging during estimation in view of the choice model data stored in the respondent database 102.

In some examples, the straight matrix may not be computationally efficient for the ALS engine 108. The example straight matrix includes a relatively high degree of flexibility when compared to one or more alternate matrix structures, such as a symmetric matrix and/or a geometric matrix. As described in further detail below, while the symmetric matrix and/or the geometric matrix impose a greater degree of computational constraint when compared to the straight matrix, the symmetric matrix and/or the geometric matrix may be appropriate when model estimation overfits the choice model data stored in the example respondent database 102. For example, although the straight matrix includes a parameter value for each and every product combination of interest, thereby having the greatest potential to fit the choice data accurately, the relatively large number of parameters may become computationally intensive and fail to produce statistically relevant convergence during each estimation iteration.

A symmetric matrix decreases the number of parameters by a factor of two, thereby reducing computational loads for the example estimator 215. The example matrix symmetry engine 212 forces a symmetry structure of the straight matrix so that each parameter value on a lower half of the diagonal is the same (e.g., linked) as each corresponding parameter value on an upper half of the diagonal. A straight matrix may be converted into a symmetric matrix by linking cells above the matrix diagonal with cells below the matrix diagonal. In some examples, the analyst and/or client may begin with a matrix structure having a more rigid form when compared to the straight matrix and, depending on a measure of fit indication from the example measure of fit engine 216, adjust the matrix structure accordingly. In some circumstances, a symmetric matrix produces statistically appropriate measure of fit values to justify using the symmetric matrix. In other circumstances, the symmetric matrix fails to cause statistically appropriate measures of fit, in which case the straight matrix may be employed.

A geometric matrix introduces a degree of structure greater than that of the symmetric matrix, thereby affording greater conservation of computing resources during estimation by the example estimator 215. Matrix values within the geometric matrix have a spatial relationship to each other based on a number of matrix dimensions. For ease of discussion, the example geometric matrix will be described in connection with three (3) dimensions, but any other number of dimensions may be employed with the example systems, methods, apparatus and/or articles of manufacture disclosed herein.

Figure 6:
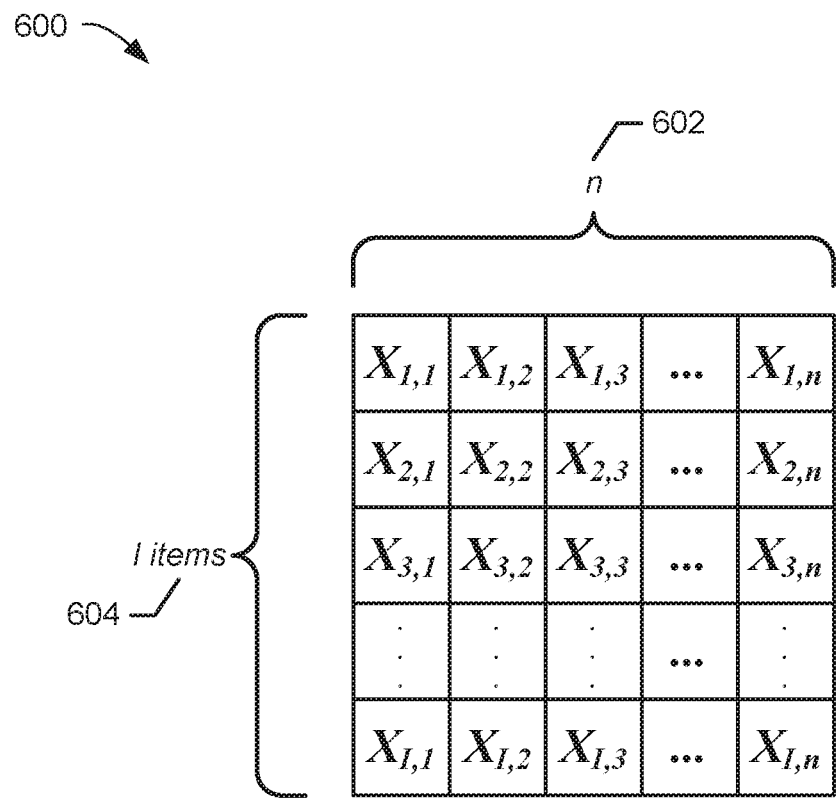
FIG. 6 is a portion of an example geometric matrix generated by the example aggregate logit sourcing engine of FIGS. 1 and 2.

FIG. 6 is a portion of an example geometric matrix 600 generated by the example matrix spatial engine 214. In the illustrated example of FIG. 6, the geometric matrix 600 includes a number of dimensions (n) (602) (columns) and a total number of items (I) (604) (rows). The number of dimensions n is constrained to be less than or equal to the number of items I. Matrix values are designated by $\chi_{(I,n)}$, and particular items (s) within the total number of items (I) are located in n-dimensional space in a manner consistent with example Equation 8.

$$(\chi_{s,1}, \chi_{s,2}, \ldots, \chi_{s,n}) \quad \text{Equation 8.}$$

For example, $\chi_{(1,1)}$ represents a first dimensional coordinate (e.g., an x-axis spatial value) for a first product, $\chi_{(1,2)}$ represents a second dimensional coordinate (e.g., a y-axis spatial value) for the first product, and $\chi_{(1,3)}$ represents a third dimensional coordinate (e.g., a z-axis spatial value) for the first product. Similarly, $\chi_{(2,1)}$ represents a first dimensional coordinate for a second product, $\chi_{(2,2)}$ represents a second dimensional coordinate for the second product, and $\chi_{(2,3)}$ represents a third dimensional coordinate for the second product. Conceptually, each product may be represented as a point in an n-dimensional space. Continuing with the above-described examples of Coke® Pepsi® and Sprite®, because Coke and Pepsi® are both cola products sold in similar markets and potentially have similar preferences, spatial coordinates for Coke® and Pepsi® are likely relatively near each other when compared to Sprite®, which is not a cola product. A relative distance between product representations in the example geometric matrix 600 may be calculated in a manner consistent with example Equation 9.

$$M_{s,v} = \sum_d (\chi_{s,d} - \chi_{v,d})^2. \quad \text{Equation 9}$$

In the illustrated example of Equation 9, M represents a distance between a first item s from the total list of items I, and another item v, and d represents a dimension from the n dimensions. As described above, the example geometric matrix 600 exhibits the least amount of flexibility because it imposes the greatest amount of structure against the provided choice data. The estimation performed by the example estimator 215 may employ the geometric matrix for circumstances in which matrices having greater degrees of freedom result in overfitting. For instance, a model (or a matrix within the model) that includes increasing numbers of parameters becomes more flexible and eventually fits the supplied data to the greatest degree, but at the expense of computational loads that may cause estimation inefficiency. Although the example geometric matrix 600 may not fit the provided choice data as well as the straight and/or the symmetric matrix, the geometric matrix 600 may be appropriate in response to statistically satisfactory measures of fit values calculated by the example measure of fit engine 216.

In some examples, rigid matrix structures may not fit well with the choice data that results from the respondent choice modeling exercise. In other words, some product mixes may not follow geometric relationships, thereby causing the application of the geometric matrix to produce poor statistical measures of fit values. For example, consider a mix of laundry detergent products that includes (a) detergent with bleach, (b) detergent with color safe bleach and (c) detergent with no bleach. Choice data results may identify a relatively large degree of substitution between (a) and (b) because consumers prefer to have a whites/colors bleach product, and the choice data results may also identify a relatively large degree of substitution between (h) and (c). Continuing with the laundry detergent example, consider that the choice data results find no substitution between (a) and (c). Generally speaking, the geometric matrix adheres to one or more logical axioms to produce conclusions. As described in the above example, if (a)=(b), and (b)=(c), then geometric principles suggest that (a) should be equal to or similar to (c) from a spatial point of view. However, the example geometric model may attempt to force relationships in a manner inconsistent with the collected choice data and force a similarity between (a) and (c) despite choice data suggesting no such relationship actually occurs. In such circumstances, a poor measure of fit results and the example measure of fit engine 216 selects an alternate matrix structure having a greater degree of flexibility.

In still further examples, subcategories may be employed to, in part, reduce matrix sizes. Generating one or more subcategories imposes further constraint on the model and may introduce a degree of analyst discretion. However, in circumstances where a matrix becomes large due to a large number of products, employing one or more subcategories reduces a computational burden of the model. For example, a matrix representing 100 items includes 100 rows and 100 columns, which corresponds to 10,000 individual matrix cells. In the event that 30 subcategories are employed, then a number of columns and rows each collapse to form a 30 by 30 matrix, thereby substantially reducing a computational burden of parameter value estimation. For instance, if Pepsi® and Coke® are deemed similar (e.g., any differences between the two are inconsequential), then a subcategory indicative of national cola brands may allow the rows and columns associated with Coke® and Pepsi® to collapse together. In other words, multiple products may share the same M values when they share the same subcategory.

Equation 10 illustrates an example manner in which each model row is calculated with a weight (w) in view of S subcategories.

$$w_S = \frac{\sum_{j \in S} e^{\beta_j}}{\sum_{j} e^{\beta_j}}.$$

Equation 10

In the illustrated example of Equation 10, the numerator notation signifies to sum over all items in subcategory s. As such, employing subcategories allows a matrix to be formed as an S by S matrix rather than the larger I by I matrix described above. In view of the implementation of subcategories, choice probability may be calculated in a manner consistent with example Equation 11.

$$C_i = \sum_{s} w_s \frac{e^{[\beta_i - M_{s,vi} + (\beta_{pi} + \beta_{p's})\$_i]}}{\sum_{j} e^{[\beta_j - M_{s,vj} + (\beta_{pj} + \beta_{p's})\$_j]}}.$$

Equation 11

While an example manner of implementing an example system 100 to model consumer choice sourcing has been illustrated in FIGS. 2-6, one or more of the elements, processes and/or devices illustrated in FIGS. 1-6 may be combined, divided, re-arranged, omitted, eliminated and/or implemented in any other way. Further, the example respondent database 102, the example product selection database 104, the example price/availability control 106, the example ALS engine 108, the example choice modeling engine 202, the example MNL engine 204, the example aggregate building engine 206, the example sourcing modifier 208, the example matrix engine 210, the example matrix symmetry engine 212, the example matrix spatial engine 214, the example estimator 215, the example measure of fit engine 216 and/or the example simulation engine 218 of FIGS. 1 and 2 may be implemented by hardware, software, firmware and/or any combination of hardware, software and/or firmware. Thus, for example, any of the example respondent database 102, the example product selection database 104, the example price/availability control 106, the example ALS engine 108, the example choice modeling engine 202, the example MNL engine 204, the example aggregate building engine 206, the example sourcing modifier 208, the example matrix engine 210, the example matrix symmetry engine 212, the example matrix spatial engine 214, the example estimator 215, the example measure of fit engine 216 and/or the example simulation engine 218 of FIGS. 1 and 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of the patent are read to cover a purely software and/or firmware implementation, at least one of the example respondent database 102, the example product selection database 104, the example price/availability control 106, the example ALS engine 108, the example choice modeling engine 202, the example MNL engine 204, the example aggregate building engine 206, the example sourcing modifier 208, the example matrix engine 210, the example matrix symmetry engine 212, the example matrix spatial engine 214, the example estimator 215, the example measure of fit engine 216 and/or the example simulation engine 218 of FIGS. 1 and 2 are hereby expressly defined to include a tangible computer readable medium such as a memory. DVD, CD, etc. storing the software and/or firmware. Further still, the example system 100 of FIG. 1 may include one or more elements, processes and/or devices in addition to, or instead of, those illustrated in FIGS. 1 and 2, and/or may include more than one of any or all of the illustrated elements, processes and devices.

Figure 7:
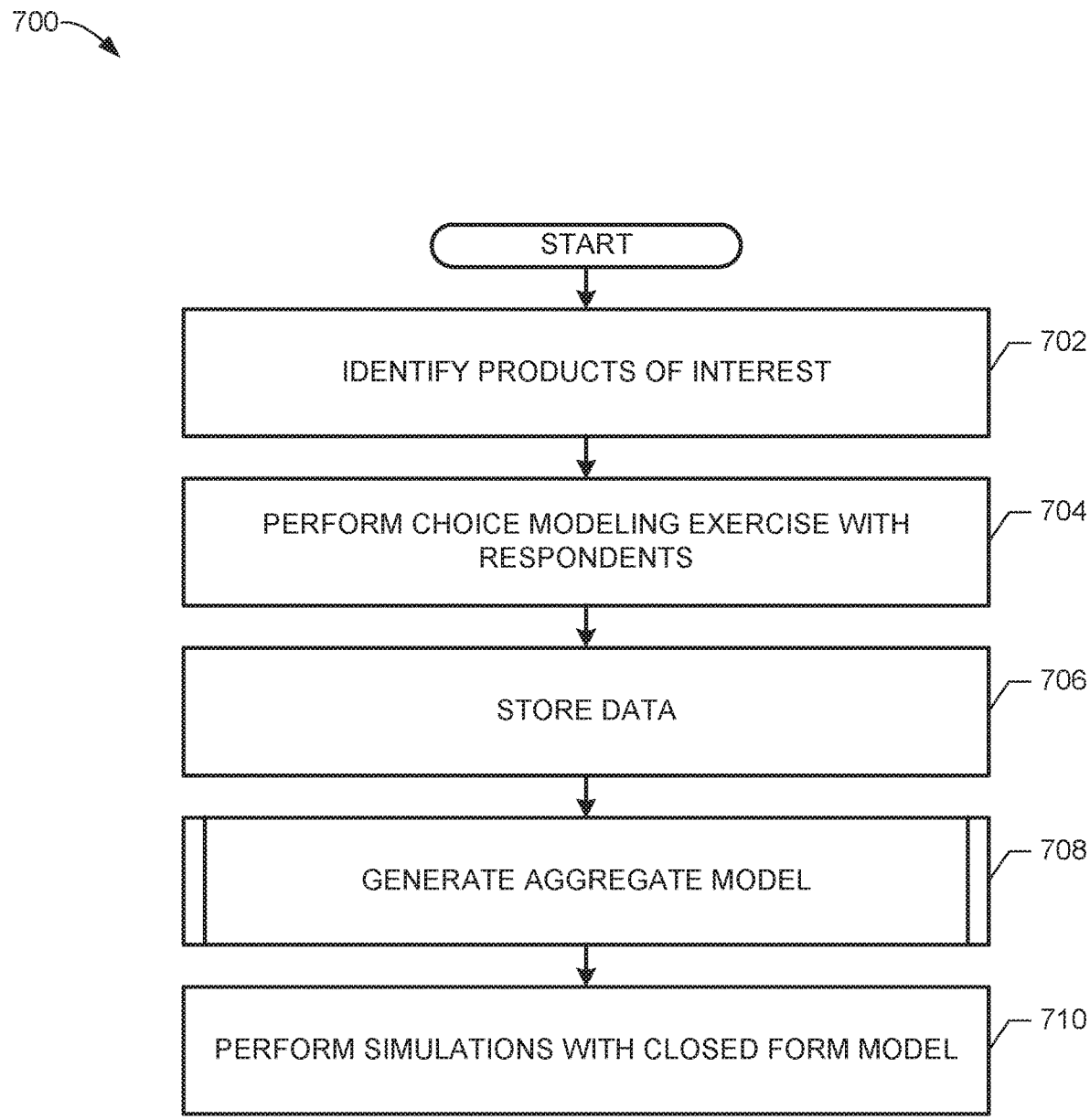
FIGS. 7-9 are flowcharts representative of example machine readable instructions that may be executed to implement the example system shown in FIGS. 1 and 2.
Figure 8:
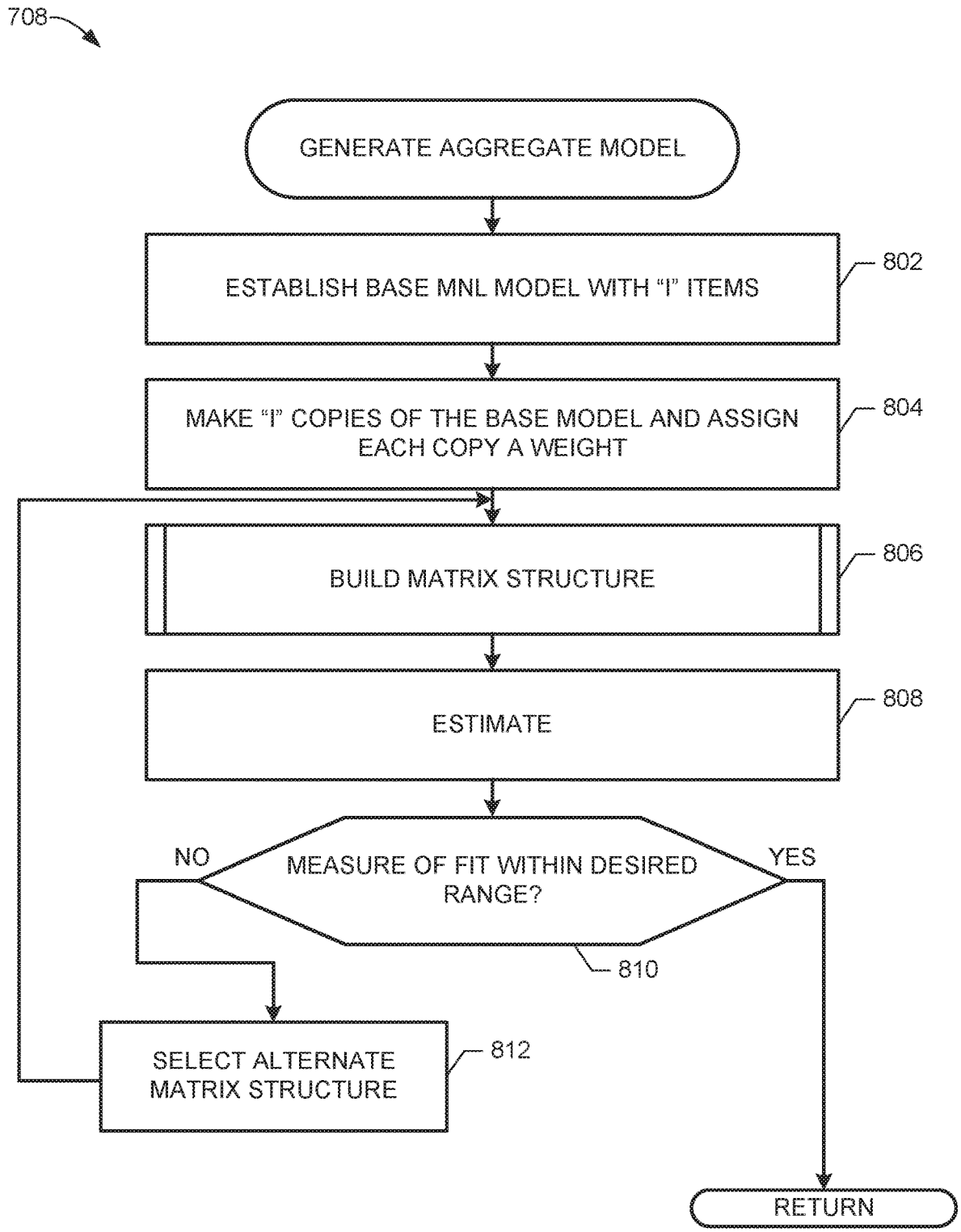
Figure 9:
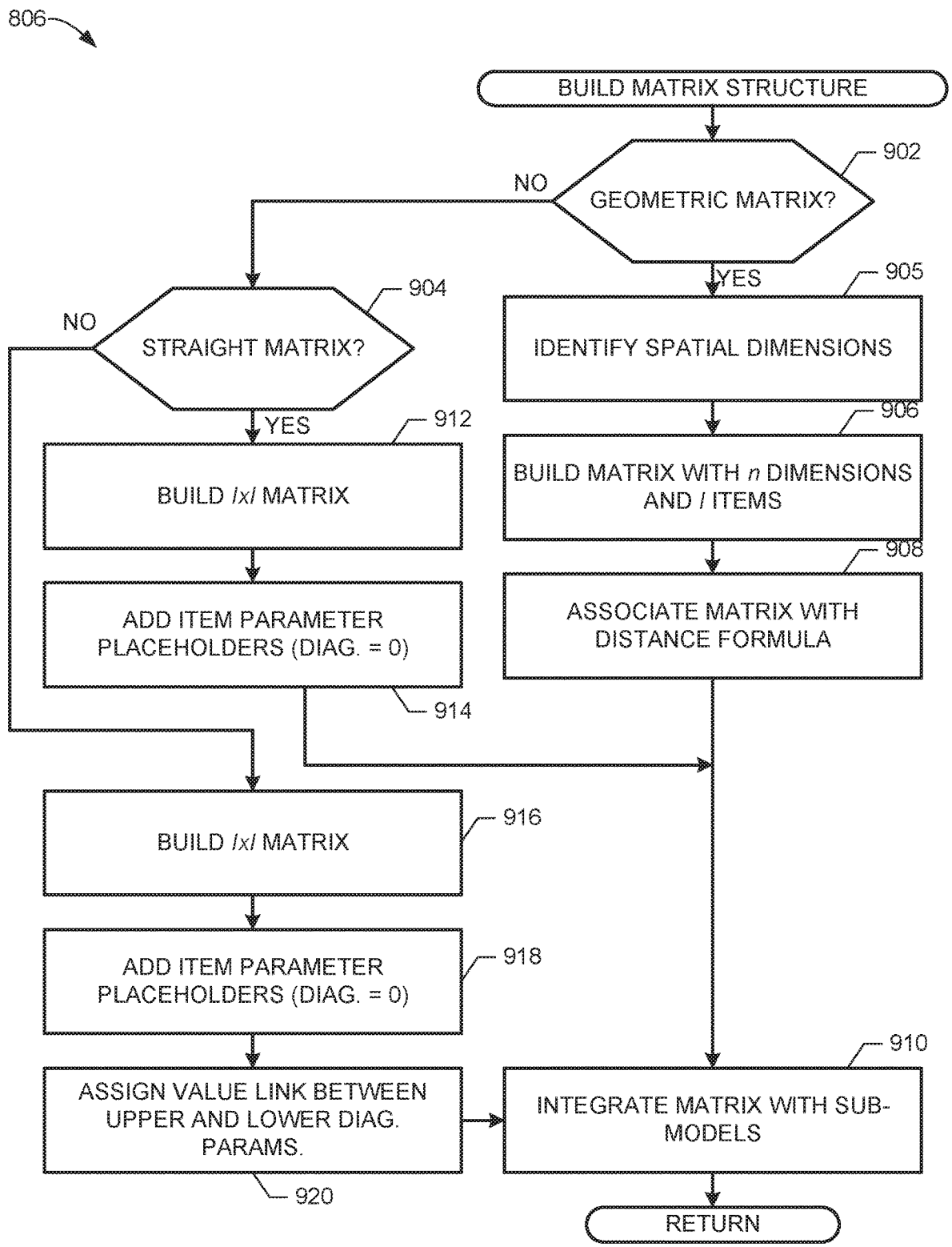

Flowcharts representative of example machine readable instructions for implementing the system 100 of FIGS. 1 and 2 are shown in FIGS. 7-9. In these examples, the machine readable instructions comprise a program for execution by a processor such as the processor P105 shown in the example computer P100 discussed below in connection with FIG. 10. The program may be embodied in software stored on a tangible computer readable medium such as a CD-ROM, a floppy disk, a hard drive, a digital versatile disk (DVD), or a memory associated with the processor P105, but the entire program and/or parts thereof could alternatively be executed by a device other than the processor P105 and/or embodied in firmware or dedicated hardware. Further, although the example program is described with reference to the flowcharts illustrated in FIGS. 7-9, many other methods of implementing the example system 100 may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The process 700 of FIG. 7 begins at block 702 where the example choice modeling engine 202 identifies products of interest to be studied. The example choice modeling engine 202 may facilitate a user interface to allow an analyst and/or client select products of interest, which may include existing market products, existing competitive market products and/or new products that have not yet been offered for sale in the market. The example product selection database 104 may include one or more lists of available market products and/or details related to the products. In some examples, the product selection database 104 may include data from the product reference library (PRL) cultivated and managed by Nielsen®, which codes more than 700,000 items, in which each item includes an average of forty (40) descriptive characteristics, is an example source for such product information. However, the example systems, methods, apparatus and/or articles of manufacture are not limited to using the PRL as one or more alternate sources of product reference data may be employed. Product information may include, but is not limited to product name, manufacturer name, brand, packaging type, product size, flavor, lot number, serial number, nutritional information and/or a corresponding universal product code (UPC), One or more price points and/or ranges of price points may be identified and associated with the identified products of interest to be communicated to one or more respondents during a choice modeling exercise. Once a set of products of interest are identified, the example choice modeling engine performs a choice modeling exercise with respondents (block 704) and saves choice data to the example respondent database 102 (block 706). As described above, and in further detail below, the stored choice data is utilized during an iterative estimation process to converge parameter values of an aggregate model generated and/or otherwise built by the example ALS engine 108 (block 708), such as the example matrix infused aggregate model structure 500 of FIG. 5. The example aggregate model generated by the ALS engine 108 may be applied in closed-loop format to one or more simulations to calculate choice probability values of one or more products (block 710).

The program 708 of FIG. 8 illustrates further detail related to generating the aggregate model described in FIG. 7. In the illustrated example of FIG. 8, the program 708 invokes the MNL engine 204 to establish a base MNL model having a number of items equal to those used in the choice modeling exercise (block 802). For example, if eighty (80) products items were selected to be studied, then the example MNL engine 204 generates a MNL model having eighty (80) parameters. Without limitation, the example MNL engine 204 may include product parameters, price parameters and/or any number of parameters that reflect attribute preferences associated with each product.

The example aggregate building engine 206 makes I copies of the base MNL model generated by the example MNL engine 204 (block 804). As described above, while each MNL model, by itself, exhibits negative effects of the IIA property, the example aggregate building engine 206 builds an aggregate model to, in part, minimize and/or otherwise drown-out the negative effects of the IIA property. Additionally, to impose a sourcing effect of every product of interest on every other product of interest in a proportional manner, the example aggregate building engine 206 invokes the example sourcing modifier 208 to generate one or more matrix structures (block 806), as described above and as described in further detail below.

The aggregate model generated by the aggregate building engine 206 and the mater generated by the example sourcing modifier 208 are iteratively estimated by the example estimator 215 (block 808). As described above, the iterative estimations allow the aggregate model parameters and the matrix parameters to converge to one or more values that fit the choice data stored in the example respondent database 102. Resulting model parameters and matrix parameters are evaluated by the example measure of fit engine 216 to determine whether the converged parameter values are statistically appropriate in view of the supplied choice data (block 810). If not, then the example measure of fit engine 216 invokes the example sourcing modifier 208 to generate an alternate matrix structure having a greater or lesser degree of structure (block 812), and the example program 708 returns to block 806. For example, in the event that a highly structured geometric model fails to converge with parameters that are statistically appropriate, then a symmetric or straight matrix may be employed. On the other hand, in the event that a straight matrix becomes computationally intensive and/or suffers from overestimation, then the example measure of fit engine may invoke the example sourcing modifier 208 to generate a matrix having additional structure, such as a symmetric matrix or a geometric matrix.

The program 806 of FIG. 9 illustrates further detail related to building the matrix structure described in FIG. 8. In the illustrated example of FIG. 9, the program 806 determines whether to generate a geometric matrix (block 902), a straight matrix (block 904) or a symmetric matrix (block 904). In the event a geometric matrix is to be generated (block 902), the example sourcing modifier 208 identifies a number of spatial dimensions to use (block 905). Spatial dimensions can be less than or equal to the number of products (items) of interest used in the choice modeling exercise. A greater number of dimensions (n) result in a greater number of matrix parameters, a greater resolution and a greater chance for better fitting the supplied choice data. However, a greater number of dimensions (n) also results in a greater computational burden for the example estimator 215. In some examples, the example sourcing modifier 208 invokes the matrix spatial engine 214 as a first attempt under an assumption and/or empirical understanding that a geometric matrix is an appropriate and efficient choice for the type(s) of product mix of the selected products (I). The Matrix spatial engine 214 builds the geometric matrix having n dimensions as columns, and I items as rows (block 906) so that each product pair spatial distance can be calculated in a manner consistent with example Equation 9 (block 908). Each matrix element is associated with the matrix infused aggregate model structure, such as the structure 500 of FIG. 5, in a manner that allows the example estimator 215 to perform iterative estimations for parameter convergence (block 910).

In the event that a straight matrix is to be employed (block 904), the example sourcing modifier 208 employs the matrix engine 210 to build a square matrix of a size based on the number of products (items) of interest (I) (block 912). In other words, the example matrix engine 210 builds an I×I matrix structure (block 912), and then adds index parameter placeholders in each matrix cell (block 914). As described above, because the matrix row includes a representation of each product of interest (e.g., counting from a matrix row index value of 1 to I), and because the matrix column includes a representation of each product of interest in the same order as those products listed in the row (e.g., counting from a matrix column index value of 1 to I), then the diagonal cells will each be set to zero. Each matrix element is associated with the matrix infused aggregate model structure, such as the structure 500 of FIG. 5, in a manner that allows the example estimator 215 to perform iterative estimations for parameter convergence (block 910).

In the event that a symmetric matrix is to be employed (block 904), then the example sourcing modifier 208 employs the matrix symmetry engine 212 to build a square matrix of a size based on the number of products (items) of interest (I) (block 916). In other words, the example matrix symmetry engine 212 builds an I×I matrix structure (block 916), and then adds index parameter placeholders in each matrix cell (block 918). To force a symmetric structure, the example matrix spatial engine 214 identifies matching matrix cells on either side of the matrix diagonal and sets them equal to each other (block 920). In some examples, the symmetric matrix can be implemented as a half-matrix that only employs parameters on the upper or lower half of the matrix diagonal. As such, the symmetric matrix only employs half as many parameters as the straight matrix during the iterative estimation executed by the example estimator 215. Each matrix element is associated with the matrix infused aggregate model structure, such as the structure 500 of FIG. 5, in a manner that allows the example estimator 215 to perform iterative estimations for parameter convergence (block 910).

Figure 10:
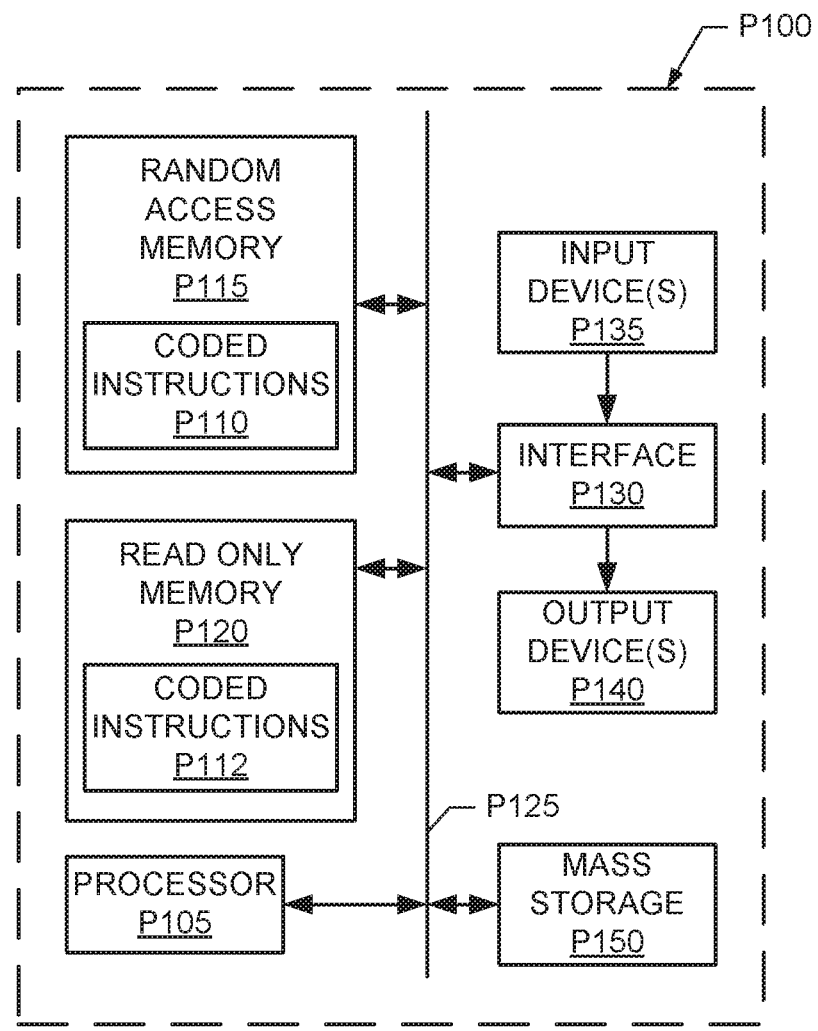
FIG. 10 is a schematic illustration of an example processor platform that may execute the instructions of FIGS. 7-9 to implement any or all of the example methods, systems, and apparatus described herein.

FIG. 10 is a block diagram of an example computer P100 capable of executing the instructions of FIGS. 7, 8 and/or 9 to implement the example respondent database 102, the example product selection database 104, the example price/availability control 106, the example ALS engine 108, the example choice modeling engine 202, the example MNL engine 204, the example aggregate building engine 206, the example sourcing modifier 208, the example matrix engine 210, the example matrix symmetry engine 212, the example matrix spatial engine 214, the example estimator 215, the example measure of fit engine 216 and/or the example simulation engine 218 of FIGS. 1 and 2. The computer P100 can be, for example, a server, a personal computer, an Internet appliance, or any other type of computing device.

The system P100 of the instant example includes a processor P105. For example, the processor P105 can be implemented by one or more Intel® microprocessors from the Pentium® family, the Itanium® family or the XScale® family. Of course, other processors from other families are also appropriate.

The processor P105 is in communication with a main memory including a volatile memory P115 and a non-volatile memory P120 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory P120 may be implemented by flash memory and/o y oilier desired type of memory device. Access to the main memory P115, P120 is typically controlled by a memory controller (not shown).

The computer P100 also includes an interface circuit P130 The interface circuit P130 may be implemented by any type of interface standard, such as an Ethernet interface, a universal serial bus (USB), and/or a PCI express interface.

One or more input devices P135 are connected to the interface circuit P130. The input device(s) P135 permit a user to enter data and commands into the processor P105. The input device(s) can be implemented by, for example, a keyboard, a mouse, a touchscreen, a track-pad, a trackball, and/or a voice recognition system.

One or more output devices P140 are also connected to the interface circuit P130. The output devices P140 can be implemented, for example, by display devices (e.g., a liquid crystal display, a cathode ray tube display (CRT), and/or other display). The interface circuit P130, thus, typically includes a graphics driver card.

The interlace circuit P130 also includes a communication device (not shown) such as a modem or network interface card to facilitate exchange of data with external computers via a network (e.g., an Ethernet connection, a digital subscriber line (DSL), a telephone line, coaxial cable, a cellular telephone system, etc.).

The computer P100 also includes one or more mass storage devices P150 for storing software and data. Examples of such mass storage devices P150 include floppy disk drives, hard drive disks, compact disk drives and digital versatile disk (DVD) drives. The mass storage device P150 may implement the example respondent database 102 and/or the example product selection database 104.

The coded instructions of FIGS. 7-9 may be stored in the mass storage device P150, in coded instructions P110 of the volatile memory P115, in coded instructions P112 of the non-volatile memory P120, and/or on a removable storage medium such as a CD or DVD.

From the foregoing, it will be appreciated that the above disclosed systems, methods, apparatus and articles of manufacture facilitate prediction of new product performance metrics within one or more geographies and/or channels of interest when no prior historical sales data is available for the new product in the corresponding geography or channel.

Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. An apparatus to calculate a choice probability, the apparatus comprising:
   a choice modeling engine to retrieve respondent choice data via virtual shopping trips, the choice modeling engine to store the respondent choice data in a respondent database;
   a multinomial logit (MNL) engine, implemented by at least one processor, to add a set of products to a base MNL model, the set of products retrieved from the respondent database via a network and based on the respondent choice data associated with the virtual shopping trips;
   an aggregate building engine, implemented by the at least one processor, to build an aggregate model by generating a number of copies of the base MNL model, the number of copies based on a number of corresponding ones of products in the set of products associated with the virtual shopping trips;

a sourcing modifier, implemented by the at least one processor, to proportionally modify interrelationships between dissimilar ones of the number of corresponding ones of the products in the set of products to reduce a negative effect of the dissimilar ones of the number of corresponding ones of the products have on calculating the choice probability by inserting product offset values in respective ones of the number of copies of the base MNL model, the product offset values generated by subtracting sourcing effect values in the aggregate model from item utility parameters, the product offset values associated with respective ones of products in the set of products; and a simulation engine, implemented by the at least one processor, to calculate the choice probability for the number of corresponding ones of the products in the set of products based on the product offset values.

2. The apparatus as defined in claim 1, further including an estimator to estimate the item utility parameters of the aggregate model, the item utility parameters based on (a) the number of copies of the base MNL model and (b) the respondent choice data associated with the virtual shopping trips.

3. The apparatus as defined in claim 2, wherein the sourcing modifier is to generate a geometric matrix when the item utility parameters overfit the respondent choice data, the geometric matrix reducing a number of the item utility parameters to produce statistically relevant convergence during estimation.

4. The apparatus as defined in claim 3, wherein the sourcing modifier is to identify a number of spatial dimensions to generate the geometric matrix, the number of spatial dimensions to not exceed a number of products in the set of products.

5. The apparatus as defined in claim 1, wherein the sourcing modifier is to generate a straight matrix when a geometric matrix fails to converge with the item utility parameters.

6. The apparatus as defined in claim 5, wherein the sourcing modifier is to add index parameter placeholders in each matrix cell of the straight matrix to allow the aggregate model to consider an effect of each product in the set of products on a first product in the set of products.

7. The apparatus as defined claim 1, wherein the aggregate building engine is to integrate a matrix with the number of copies of the base MNL model.

8. A tangible machine-readable storage medium comprising instructions that, when executed, cause a processor to, at least:

retrieve respondent choice data via virtual shopping trips, the respondent choice data to be stored in a respondent database;

add a set of products to a base multinomial logit (MNL) model, the set of products retrieved from the respondent database via a network and based on the respondent choice data associated with the virtual shopping trips;

build an aggregate model by generating a number of copies of the base MNL model, the number of copies based on a number of corresponding ones of the products in the set of products associated with the virtual shopping trips;

proportionally modify interrelationships between dissimilar ones of the number of corresponding ones of the products in the set of products to reduce a negative effect of the dissimilar ones of the number of corresponding ones of the products on calculating a choice probability by inserting product offset values in respective ones of the number of copies of the base MNL model, the product offset values generated by subtracting sourcing effect values in the aggregate model from item utility parameters, the product offset values associated with respective ones of products in the set of products; and calculate the choice probability for the number of corresponding ones of the products in the set of products based on the product offset values.

9. The machine-readable storage medium as defined in claim 8, further including instructions that, when executed, cause the processor to estimate the item utility parameters of the aggregate model, the item utility parameters based on (a) the number of copies of the base MNL model and (b) the respondent choice data associated with the virtual shopping trips.

10. The machine-readable storage medium as defined in claim 9, further including instructions that, when executed, cause the processor to generate a geometric matrix when the item utility parameters overfit the respondent choice data, the geometric matrix reducing a number of the item utility parameters to produce statistically relevant convergence during estimation.

11. The machine-readable storage medium as defined in claim 10, further including instructions that, when executed, cause the processor to identify a number of spatial dimensions to generate the geometric matrix, the number of spatial dimensions to not exceed a number of products in the set of products.

12. The machine-readable storage medium as defined in claim 8, further including instructions that, when executed, cause the processor to generate a straight matrix when a geometric matrix fails to converge with the item utility parameters.

13. The machine-readable storage medium as defined in claim 12, further including instructions that, when executed, cause the processor to add index parameter placeholders in each matrix cell of the straight matrix to allow the aggregate model to consider an effect of each product in the set of products on a first product in the set of products.

14. An apparatus to calculate choice probability, the apparatus comprising:

means for retrieving respondent choice data via virtual shopping trips, the respondent choice data to be stored in a respondent database;

means for adding to add a set of products to a base multinomial logit (MNL) model, the set of products retrieved from the respondent database via a network and based on the respondent choice data associated with the virtual shopping trips;

means for building to build an aggregate model by generating a number of copies of the base MNL model, the number of copies based on a number of corresponding ones of products in the set of products associated with the virtual shopping trips;

means for modifying to proportionally modify interrelationships between dissimilar ones of the number of corresponding ones of the products in the set of products to reduce a negative effect of the dissimilar ones of the number of corresponding ones of the products have on calculating the choice probability by inserting product offset matte values in respective ones of the number of copies of the base MNL model, the product offset values generated by subtracting sourcing effect values in the aggregate model from item utility parameters, the product offset values associated with respective ones of products in the set of products; and means for calculating to calculate the choice probability for the number of corresponding ones of the products in the set of products based on the product offset values.

15. The apparatus as defined in claim 14, further including means for estimating to estimate the item utility parameters of the aggregate model, the item utility parameters based on (a) the number of copies of the base MNL model and (b) the respondent choice data associated with the virtual shopping trips.

16. The apparatus as defined in claim 15, wherein the means for modifying is to generate a geometric matrix when the item utility parameters overfit the respondent choice data, the geometric matrix reducing a number of the item utility parameters to produce statistically relevant convergence during estimation.

17. The apparatus as defined in claim 16, wherein the means for modifying is to identify a number of spatial dimensions to generate the geometric matrix, the number of spatial dimensions to not exceed a number of products in the set of products.

18. The apparatus as defined in claim 14, wherein the means for modifying is to generate a straight matrix when a geometric matrix fails to converge with the item utility parameters.

19. The apparatus as defined in claim 18, wherein the means for modifying is to add index parameter placeholders in each matrix cell of the straight matrix to allow the aggregate model to consider an effect of each product in the set of products on a first product in the set of products.

20. The apparatus as defined in claim 14, wherein the means for building is to integrate a matrix with the number of copies of the base MNL model.

* * * * *